United States Patent [19]

Sugiya

[11] Patent Number: 5,912,760
[45] Date of Patent: *Jun. 15, 1999

[54] LIGHT AMPLIFIER

[75] Inventor: Hideaki Sugiya, Kawasaki, Japan

[73] Assignee: Fujitsu Limited, Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/871,292

[22] Filed: Jun. 9, 1997

Related U.S. Application Data

[62] Division of application No. 08/530,875, Sep. 20, 1995, Pat. No. 5,664,131.

[30] Foreign Application Priority Data

Mar. 17, 1995 [JP] Japan ................................... 7-059564

[51] Int. Cl.$^6$ ................................................ H01S 3/00
[52] U.S. Cl. .......................................... 359/341; 359/177
[58] Field of Search ................................. 359/341, 160, 359/177

[56] References Cited

U.S. PATENT DOCUMENTS

| | | |
|---|---|---|
| 5,050,949 | 9/1991 | DiGiovanni et al. . |
| 5,177,634 | 1/1993 | Way . |
| 5,239,607 | 8/1993 | da Silva et al. . |
| 5,280,383 | 1/1994 | Federici et al. . |
| 5,374,973 | 12/1994 | Maxham et al. ............... 359/341 |
| 5,406,404 | 4/1995 | DiGiovanni et al. . |
| 5,428,471 | 6/1995 | McDermott ..................... 359/177 |
| 5,430,572 | 7/1995 | DiGiovanni et al. . |
| 5,436,760 | 7/1995 | Nakabayashi . |
| 5,440,418 | 8/1995 | Ishimura et al. ................ 359/177 |
| 5,497,264 | 3/1996 | Bayart et al. . |
| 5,502,810 | 3/1996 | Watanabe ........................ 359/174 |
| 5,506,724 | 4/1996 | Shimizu et al. ................. 359/341 |
| 5,600,481 | 2/1997 | Nakabayashi .................. 359/341 |

FOREIGN PATENT DOCUMENTS

| | | |
|---|---|---|
| 3-206427 | 9/1991 | Japan . |
| 5-48207 | 2/1993 | Japan . |
| 5-63259 | 3/1993 | Japan . |
| 5-107573 | 4/1993 | Japan . |
| 5-241209 | 9/1993 | Japan . |
| 7-212315 | 8/1995 | Japan . |

OTHER PUBLICATIONS

Y. Sugaya, Novel Configuration For Low–Noise and Wide–Dynamic–Range Er–Doped Fiber Amplifier for WDM Systems; Jun. 16, 1995.

*Primary Examiner*—Mark Hellner
*Attorney, Agent, or Firm*—Helfgott & Karas, P.C.

[57] ABSTRACT

A light amplifier includes first and second light amplifying parts, and a first control part. The first light amplifying part has a first number of elements or ions performing a light amplifying operation and is excited by a first exciting light which is excessive with respect to the first number of elements or ions. The first light amplifying part amplifies a signal light applied hereto. The second light amplifying part has a second number of elements or ions performing a light amplifying operation and is excited by a second exciting light having a constant intensity. The second number is than the first number. The second light amplifying part amplifies an amplified signal light output from the first light amplifying part. The first control part performs a control operation so that an intensity of the amplified signal light output from the first light amplifying part is constant.

11 Claims, 17 Drawing Sheets

LIGHT AMPLIFIER

This is a division of application Ser. No. 08/530,875, filed Sep. 20, 1995, now U.S. Pat. No. 5,664,131.

BACKGROUND OF THE INVENTION

1. Field of the Invention

The present invention generally relates to light amplifiers, and more particularly to a light amplifier suitable for a situation in which a light amplifying operation is performed in a transmission path.

In optical communications in which signals are wavelength-multiplexed, it is required that the gain of a light amplifier is constant with respect to the wavelengths of signal lights.

2. Description of the Related Art

A light output control has been reduced to practical use in which a light amplifier regulates the light output to a constant level. However, the dependence of the gain of the light amplifier with respect to the signal wavelengths is still in the researching stage.

Several control methods for controlling the wavelength-dependence of the light amplifier gain have been proposed. For example, the composition of an amplifying medium is varied, or amplifying media having different compositions are combined together. Another proposed method is to use a filter having the function of compensating for the wavelength-dependence of the amplifying medium.

However, the known control methods cannot remove the dependence of the wavelength-dependence of the light amplifier with respect to the intensity of an incident light. In this regard, a light amplifier utilizing a rare-earth-doped glass has been proposed. Another light amplifier has also been proposed and marketed only for use in research, in which fluoride glass is used as host glass in order to reduce the wavelength-dependence of the cross section for emission and absorption. However, fluoride glass does not have a good reliability in the water resistance of fluoride glass, and has a difficulty in splicing for connections because the melting point thereof is quite different from that of normal glass. Further, there is a problem in which fluoride glass itself has a good reliability. For the above reasons, use of fluoride glass is not suitable for applications to main routes of commercial communications services.

The wavelength-dependence of the light amplifier gain has an input-light-intensity-dependence as shown in FIG. 1, which shows characteristics of an erbium-doped fiber amplifier. More particularly, FIG. 1 shows gain differences with respect to the maximum gain when sweeping the probe light between 1550 nm and 1554 nm. In the prior art, there is no consideration of the input-light-intensity-dependence of the light amplifier gain.

Normally, in the see-bottom optical filters, optical repeaters are intermittently provided in the optical fiber cable at given intervals. It is possible to equally arrange each of the optical repeaters so as to have a light amplifying characteristic compensating for the input-light-intensity-dependence, so that the wavelength-dependence of the light amplifier gain can be optimized. On the other hand, in the ground light communications systems, light repeaters are not provided at given intervals. Hence, in order to optimize the light repeaters, it is required that each of the light repeaters be optimized taking into a respective installed location. This is troublesome and reduces the advantages of use of the light amplifiers.

SUMMARY OF THE INVENTION

It is a general object of the present invention to provide a light amplifier in which the above disadvantages are eliminated.

A more specific object of the present invention is to provide a light amplifier in which the input-light-intensity-dependence thereof is suppressed and a constant wavelength dependence of the amplifier gain with respect to a wide intensity of the input light.

The above objects of the present invention are achieved by a light amplifier comprising: a first light amplifying part which has a first number of elements or ions performing a light amplifying operation and which is excited by a first exciting light which is excessive with respect to the first number of elements or ions, the first light amplifying part amplifying a signal light applied hereto; a second light amplifying part which has a second number of elements or ions performing a light amplifying operation and which is excited by a second exciting light having a constant intensity, the second number being than the first number, the second light amplifying part amplifying an amplified signal light output from the first light amplifying part; and a first control part which performs a control operation so that an intensity of the amplified signal light output from the first light amplifying part is constant.

The above first control part may control an intensity of the first exciting light so that the intensity of the amplified signal light output from the light amplifying part is constant.

The first control part may attenuate the signal light which is input to the first light amplifier so that the intensity of the amplified signal light output from the light amplifying part is constant.

The above objects of the present invention are also achieved by a light amplifier comprising: a first light amplifying part which is excited by a first exciting light and amplifies a signal light applied hereto; an inverted population generating part which is supplied with a second exciting light having a wavelength different from that of the first exciting light and which generates an inverted population of a level of elements or ions related to amplifying based on the second exciting light and another level not related to amplifying; a measuring part which measures an amplified spontaneous emission caused by the inverted population; a first control part which controls a control operation so that an intensity of an amplified signal light output from the first light amplifying part is constant; and a second control part which controls the second exciting light so that a peak wavelength or a given wavelength of the amplified spontaneous emission is constant based on a result of a measurement by the measuring part.

The above measuring part may measure the amplified spontaneous emission traveling in a direction identical to that in which the signal light travels.

The above measuring part may measure the amplified spontaneous emission traveling in a reverse direction to a direction in which the signal light travels.

The above measuring part may measure a peak wavelength of the amplified spontaneous emission. The above measuring part may measure a given wavelength of the amplified spontaneous emission.

The above objects of the present invention are also achieved by a light amplifier comprising: a first light amplifying part which is excited by a first exciting light and amplifies a signal light applied hereto; an inverted population generating part which is supplied with a second exciting light having a wavelength different from that of the first exciting light and which generates an inverted population of a level of elements or ions related to amplifying based on the second exciting light and another level not related to amplifying; a second light amplifying part which is supplied with the first exciting light and a second exciting light and which has a loop in which an output light of the loop is input hereto as an input light, the second light amplifying part having an attenuator; an attenuation control part which controls an amount of attenuation of the attenuator on the basis of the signal light input to the first light amplifying part; a first control part which controls an intensity of the second exciting light on the basis of an amplified spontaneous emission output from the attenuator; and a second control part which performs a control operation so that an intensity of the signal light output from the first light amplifying part is constant.

The above objects of the present invention are also achieved by a light amplifier comprising: a first light amplifying part which is excited by a first exciting light and amplifies a signal light applied hereto; an inverted population generating part which is supplied with a second exciting light and generates an inverted population of elements or ions performing a light amplifying operation; and a first control part which obtains a gain of the signal light by the first light amplifying part and a loss of the second exciting light and which controls an intensity of the first exciting light on the basis of the gain and the loss.

The above objects of the present invention are also achieved by a light amplifier comprising: a first light amplifying part which has a variable amplifying medium and is excited by a first exciting light, the first light amplifying part amplifying a signal light applied hereto; a first control part which controls a length of the variable amplifying medium of the first light amplifying part on the basis of an intensity of the signal light applied to the first light amplifying part; and a second control part which controls an intensity of the first exciting light on the basis of an amplified light signal output from the first light amplifying part.

The above objects of the present invention are also achieved by a light amplifier comprising: a first light amplifying part which is excited by a first exciting light and amplifies a signal light input hereto: a first control part which controls an intensity of the first exciting light so that a gain of the signal light by the first light amplifying part is constant; and a second control part which performs a control operation so that an intensity of an amplified light signal output from the first light amplifying part is constant.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Figure 1:
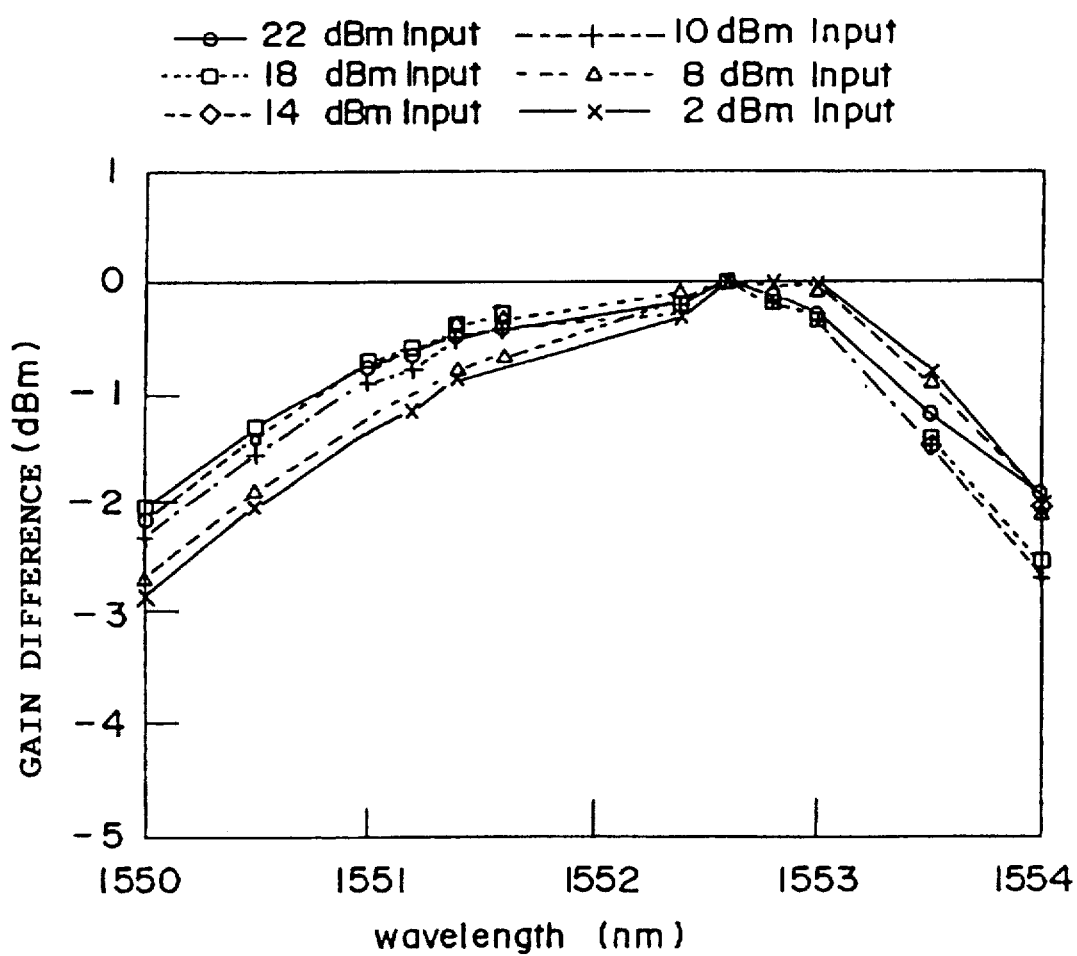
FIG. 1 is a graph of characteristics of an erbium-doped fiber amplifier.
Figure 2:
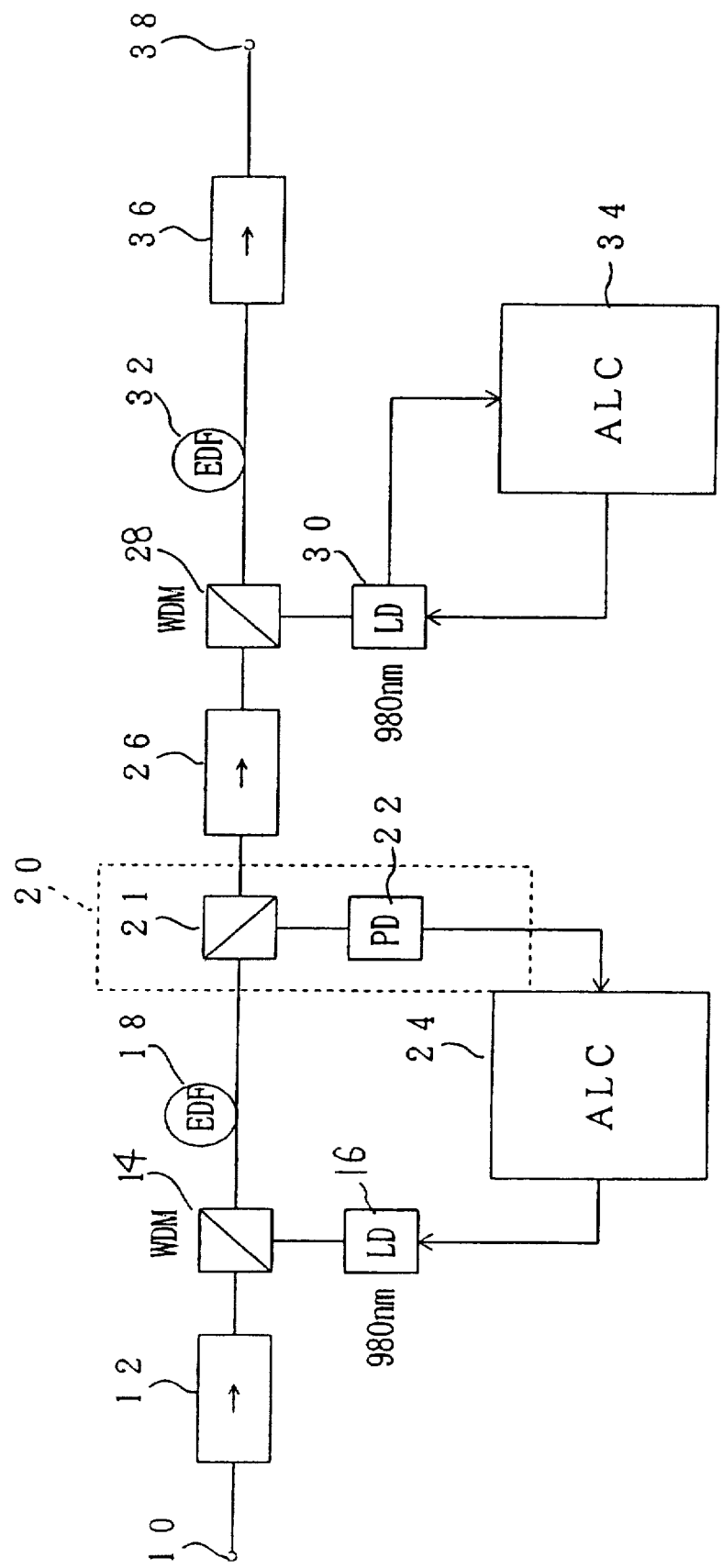
FIG. 2 is a block diagram of a light amplifier according to a first embodiment of the present invention.

FIG. 2 is a block diagram of a light amplifier according to a first embodiment of the present invention. A signal light of a wavelength in the 1550 nm band or 1560 nm is applied to a light input terminal 10. A light isolator 12 is formed with a Faraday element, and is provided in order to prevent oscillation of the light amplifier. The signal light passes through the light isolator 12 and is applied to a wavelength distribution mirror (WDM) 14. The mirror 14, which is, for example, of a fiber type, combines the signal light with a first exciting light of a wavelength of 980 nm or 1480 nm which is supplied from a laser diode (LD) 16 and is different from that of the signal light. The signal light with the first exciting light combined is supplied to an erbium-doped fiber (EDF) 18.

The erbium-doped fiber 18 has a small total amount of erbium regulated by reducing the amount of doped erbium to a small level or reducing the fiber length L. The erbium-doped fiber 18 forms a first light amplifier in cooperation with the mirror 14 and the laser diode 16, and is in an excessively excited state by the first exciting light from the laser diode 16. The signal light is amplified through the erbium-doped fiber 18 and is applied to a light intensity measuring unit 20. This unit 20 is made up of a photocoupler 21 and a photodiode 22. Part of the signal light (for example, 1/11) separated therefrom by the photocoupler 21 is supplied to the photodiode 22, which detects the light intensity. A light intensity signal output by the photodetector 22 is supplied to an automatic level control circuit (ALC) 24, which controls the intensity of the exciting light emitted from the laser diode 16 on the basis of the light intensity signal. Hence, the intensity of the output light of the erbium-doped fiber 18 can be optimized to an optimal value of a light amplifier having a next-stage erbium-doped fiber 32. The above photodiode 22 and the automatic level control circuit 24 form a first control part.

Most of the signal light separated by the photocoupler 21 passes through a light isolator 26 using a Faraday element, and is applied to the wavelength distribution mirror (WDM) 28. The isolator 26 prevents an amplified spontaneous emission component which is produced in the next-stage erbium-doped fiber 32 and is propagated in the reverse direction from entering the erbium-doped fiber 18 so that an oscillation takes place. The light isolator 26 can be omitted.

The mirror 28 combines the signal light with a second exciting light of a wavelength of 980 nm or 1480 nm supplied from a laser diode (LD) 30, and outputs a combined light to the erbium-doped fiber 32. A back power dependent on the intensity of the exciting light emitted from the laser diode 30 is applied to an automatic level control circuit (ALC) 34, which controls the laser diode 30 so that the laser diode 30 emits a constant intensity of the exciting light. The erbium-doped fiber 32 has a greater total amount of erbium by using a greater doping amount of erbium or increasing the fiber length L. The erbium-doped fiber 32 forms a second light amplifier in cooperation with the mirror 28 and the laser diode 30. The intensity of the input light to the erbium-doped fiber 32 is regulated to a fixed condition by supplying the optimized signal light from the erbium-doped fiber 18 and the second exciting light of the optimized intensity from the laser diode 30. The signal light amplified by the erbium-doped fiber 32 passes through a light isolator 36 for preventing oscillation, and is output via a light output terminal 38.

The wavelength-dependence of the gain of the erbium-doped fiber can be expressed as follows:

$$G(\lambda) = A\exp\left[\int_0^L \{\sigma e(\lambda) N_2 - \sigma a(\lambda) N_1\} dz\right] \quad (1)$$

where G is the gain of the light amplifier, σe(λ) is the absorption cross section of an amplifying medium, σa(λ) is the emission cross section thereof, $N_T$ is the number of amplifying substances per unit length of the amplifying medium, $N_2$ is the number of amplifying substances per unit length which are excited at an upper level of a two-level system, $N_1$ is the number of amplifying substances per unit length which a lower level corresponding to the ground level, L is the length of the amplifying medium along the traveling direction, and A is a constant.

It can be seen from equation (1) that the wavelength-dependence of the gain G depends on the values of $N_2$ and $N_1$ in the longitudinal direction of the amplifier, and the emission cross-section, while the magnitude of the wavelength-dependence depends on the number of elements having the amplifying function in the longitudinal direction of the amplifier. The wavelength-dependence of the gain of the light amplifier depends on only the intensity of the exciting light and the intensity of the signal light if the amplifying medium and its density are determined.

From the above consideration, it is possible to remove the input-light-intensity-dependence of the wavelength-dependence of the amplifier gain by:

1) operating the light amplifier at a constant gain;

2) controlling the total amount of elements which perform the amplifying operation based on the intensity of the input light; and/or 3) perform a control to regulate the amplifier input at a constant level.

The embodiment shown in FIG. 2 employs the erbium-doped fiber 18 having a relatively smaller number of amplifying elements or amplifying ions, and the erbium-doped fiber 32 having a relatively large number of amplifying elements or amplifying ions. It can be seen from equation (1) that the magnitude of a relative variation in the wavelength-dependence of the gain is proportional to the number of elements or ions having the amplifying function, and the shape thereof is dependent on the value of the inverted population. With the above in mind, the intensity of the input light to the second stage is subjected to the automatic level control at the first stage in which the wavelength-dependence of the gain is relatively small, as shown in FIG. 2. Hence, the intensity of the input light to the second stage having a large wavelength-dependence of the gain can be regulated at the constant level, so that the light amplifier having a small wavelength-dependence of the gain can be obtained.

In other words, in the first light amplifying part, a small total number of elements or ions having the light amplifying operation is used and the excited state is obtained by means of an excessive exciting light. Thus, the gain can be approximately constant and the input-light-intensity-dependence of the wavelength-dependence of the gain can be reduced. Thereafter, the light intensity of the signal light output from the second light amplifier part is made constant, so that the input-light-intensity-dependence of the wavelength-dependence of the gain can be suppressed. Further, the light intensity of the exciting light can be controlled at the first control part, so that the intensity of the output signal light from the first light amplifying part can be regulated at the constant level with the gain controlled to the approximately constant level.

Figure 3:
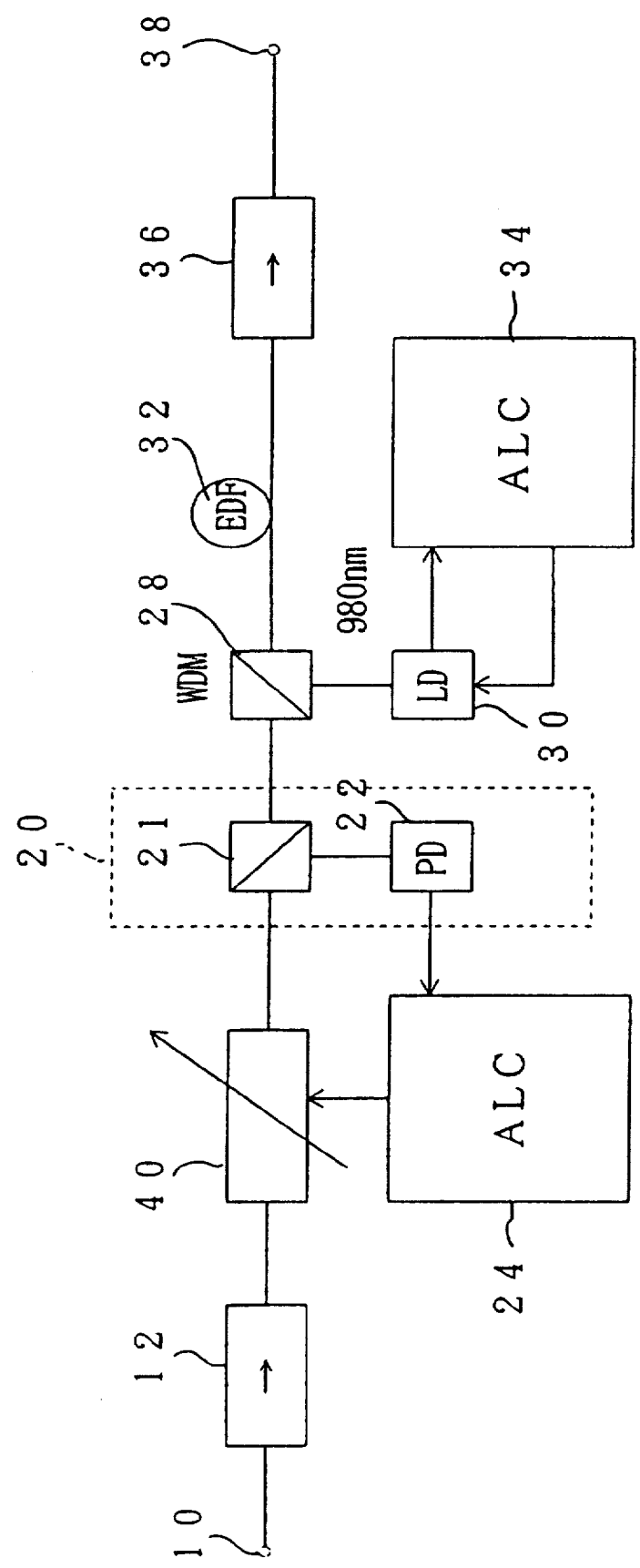
FIG. 3 is a block diagram of a light amplifier according to a second embodiment of the present invention.

FIG. 3 is a block diagram of a light amplifier according to a second embodiment of the present invention. In FIG. 3, parts that are the same as those shown in FIG. 2 are given the same reference numbers. The signal light of a wavelength in the 1550 nm band is supplied to an attenuator 40 through the light isolator 12. The attenuator 40 has a variable attenuation amount, which can be controlled by the automatic level control circuit 24. For example, the attenuator 40 includes a light switch which varies the attenuation amount by utilizing the magneto-optic effect or the acoustic-optic effect.

The signal light output from the attenuator 40 is supplied to the light intensity measuring unit 20, which is made up of the photocoupler 21 and the photodiode 21, as has been described previously. Part of the signal light separated by the photocoupler 21 is applied to the photodiode 22, which detects the intensity of the signal light. The light intensity signal is supplied to the automatic level control circuit 24, which controls the amount of attenuation of the light switch 40 on the basis of the above light intensity signal, so that the intensity of the signal light supplied to the light amplifier of the next stage becomes the optimal value.

The mirror 28 combines the signal light with the second exciting light of a wavelength of 980 nm or 1480 nm supplied from the laser diode (LD) 30, and outputs the combined light to the erbium-doped fiber 32. The back power dependent on the intensity of the exciting light emitted from the laser diode 30 is applied to the automatic level control circuit (ALC) 34, which controls the laser diode 30 so that the laser diode 30 emits a constant intensity of the exciting light. The erbium-doped fiber 32 has a greater total amount of erbium by using a greater doping amount of erbium or increasing the fiber length L. The erbium-doped fiber 32 forms the second light amplifier in cooperation with the mirror 28 and the laser diode 30. The intensity of the input light to the erbium-doped fiber 32 is regulated to a fixed condition by supplying the signal light of the optimized input light intensity by means of the light switch 40 and the second exciting light of the optimized intensity from the laser diode 30. The signal light amplified by the erbium-doped fiber 32 passes through the light isolator 36 for preventing oscillation, and is output via the light output terminal 38.

As described above, the input light to the erbium-doped fiber 32 is controlled to the constant level in the state in which the light amplifier is constantly operated. Hence, the light amplifier can be operated at the operating point at which the wavelength-dependence of the gain of the erbium-doped fiber 32 is optimized. In this way, the input-light-intensity dependence of the wavelength-dependence of the gain can be removed.

Figure 4:
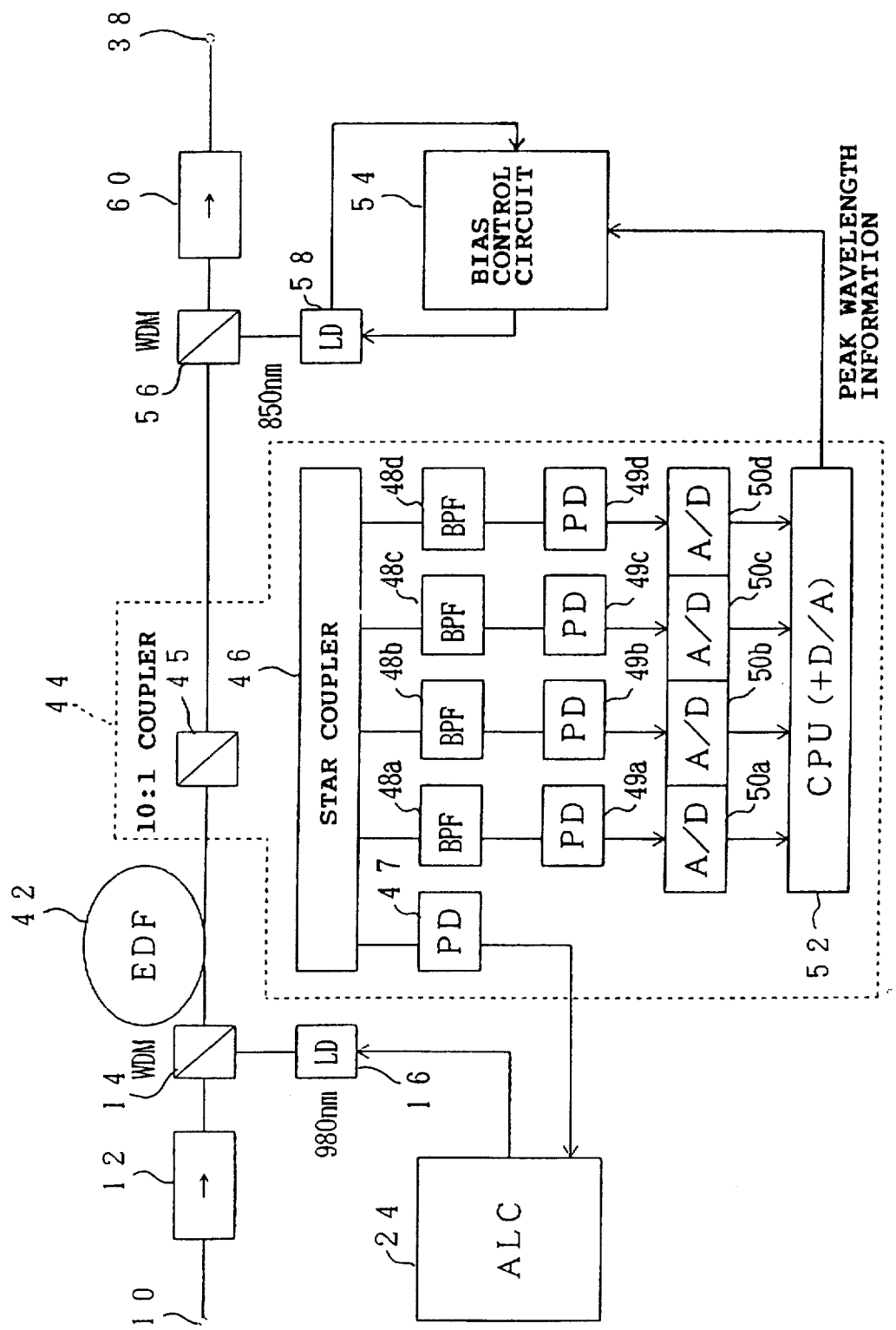
FIG. 4 is a block diagram of a light amplifier according to a third embodiment of the present invention.

FIG. 4 is a block diagram of a light amplifier according to a third embodiment of the present invention. In FIG. 4, parts that are the same as those shown in the previously described figures are given the same reference numbers. The signal light having a wavelength falling in the 1550 nm is applied to the light input terminal 10, and is supplied to the mirror 14 through the light isolator 12 used to prevent oscillation. The mirror 14 is, for example, of a fiber type which combines the signal light with the first exciting light of a wavelength of 980 nm or 1480 nm which is supplied from the laser diode (LD) 16 and is different from that of the signal light. The signal light with the first exciting light combined is supplied to an erbium-doped fiber (EDF) 42.

The erbium-doped fiber 42 forms a third light amplifier part in cooperation with the mirror 14 and the laser diode 16. The signal light amplified in the third amplifier part is supplied to a light measuring part 44. The erbium-doped fiber 42 is supplied to an exciting light having a wavelength of 810 nm from a laser diode 58 (which will be described later) through a wavelength distribution mirror 56. The above exciting light controls the hole burning or excited state absorption (ESA) of the erbium-doped fiber 42.

The light measuring part 44, which functions as an ASE (Amplified Spontaneous Emission) measuring part, is made up of a photocoupler 45, a star coupler 46, light band-pass fibers 48a through 48d, photodiodes 47, 49a–49d, A/D converters 50a–50d, and a CPU 52. Part of the signal light separated by the photocoupler 45 (equal to, for example, 1/11) is made to branch into five by the star coupler 46, so that the photodiode 47 and the light band-pass fibers 48a–48d receive the respective parts of the signal light.

The photodiode 47 detects the light intensity, which outputs a light intensity signal to the automatic level controller 24. The controller 24 controls the intensity of the exciting light emitted from the laser diode 16 so that the intensity of the output light of the erbium-doped fiber 42 can be controlled to the constant level.

The light band-pass filters 48a–48d are optical filters having a half-value width of 1 nm, which allow the wavelengths 1540 nm, 1550 nm, 1560 nm and 1570 nm to pass, respectively. Spontaneously emitted lights from the respective light band-pass filters 48a–48d are input to the photodiodes 47a–47d, which detect the respective light intensities. The intensities of the spontaneous emission lights in the respective wavelength bands are digitized by the A/D converters 50a–50d, and are then applied to the CPU 52.

The CPU 52 calculates the wavelength (peak wavelength) at which the maximum value can be obtained when fitting the light intensities of the respective bands to a three-order function by means of the least square method. Then, the CPU 52 supplies a bias control circuit 54 (which corresponds to a third control part) with peak wavelength information which indicates the value of the peak wavelength and the output light intensity.

Most of the signal light separated by the photocoupler 45 is supplied to the mirror 56. The mirror 56, which forms an inverted population generating part, combines the signal light with a fourth exciting light having a waveform of 850 nm supplied from the laser diode 58 in order to cause the ESA or hole burning. The back power dependent on the intensity of the exciting light emitted from the laser diode 58 is supplied to the bias control circuit 54. The circuit 54 controls, in the state in which the output light is subjected to the ALC based on the back power, the output of the laser diode 58 on the basis of the peak wavelength information supplied from the CPU 52 so that the wavelength obtained at the maximum value of the ASE is not changed. The signal light output from the mirror 56 passes through a light isolator 60 used to prevent oscillation, and is output via the light output terminal 38.

Figure 5:
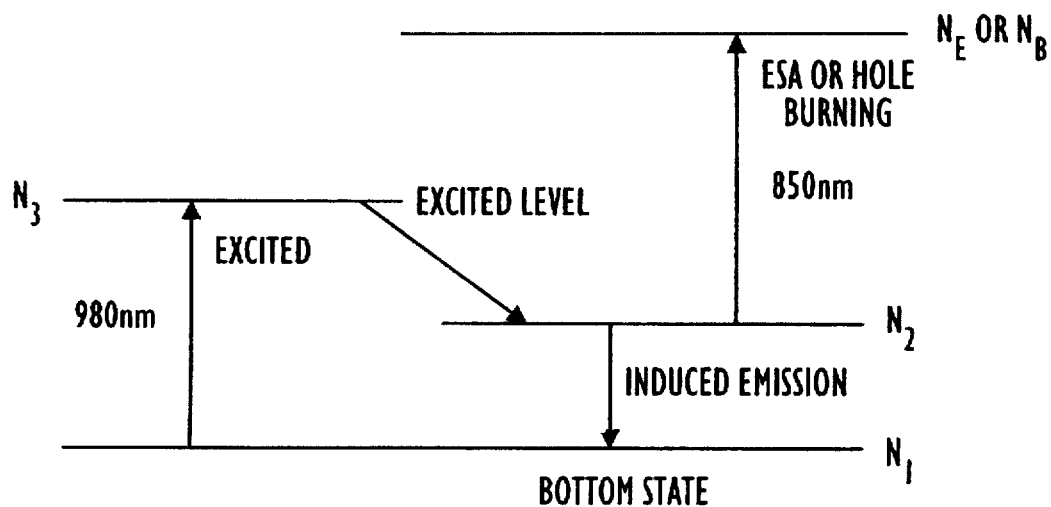
FIG. 5 is a graph showing a band structure of an erbium-doped fiber.

FIG. 5 schematically shows the band structure of a rare-earth-doped fiber such as an erbium-doped fiber or a semiconductor/light amplifier. The elements or ions performing light amplifying are excited, by the 980 nm exciting light, to a level at which induced emission can take place, and elements or ions at that level at which induced emission is possible are further excited to a level at which the induced emission is impossible (light-amplifying is impossible) due to the hole burning or ESA caused by the exciting light of a wavelength of 850 nm. The symbols $N_1$ and $_2$ shown in FIG. 5 correspond to those in equation (1).

By applying the 850 nm light which causes the ESA or hole burning to the erbium-doped fiber 42, the value of $N_2$ at which the induced emission takes place can be controlled. By utilizing the above principle, it is possible to change the gain of the amplifier in the state in which the value of the inverted population coefficient $N_2/(N_2+N_1)$ can be made constant. The inverted population coefficient is a quantity that characterizes the ASE spectrum shape, and therefore it is possible to operate the light amplifier in the state in which the inverted population coefficient is constant, by preventing a variation in the wavelength at which the maximum value is obtained, the maximum value being obtained when comparing the intensities of three or more spontaneous emission lights having different wavelengths and performing fitting of the intensities by the least square method which uses a function having an order of an integer equal to or less than the number of waveform measuring points. It can be seen from equation (1) that the wavelength-dependence of the gain is determined only by the inverted population coefficient. Hence, by using the above principle, it is possible to realize the light amplifier in which the wavelength-dependence of the gain is not varied independently of the input light. The third embodiment of the present invention utilizes the method of controlling the total number of elements or ions performing the amplifying operation based on the intensity of the input light.

Figure 6:
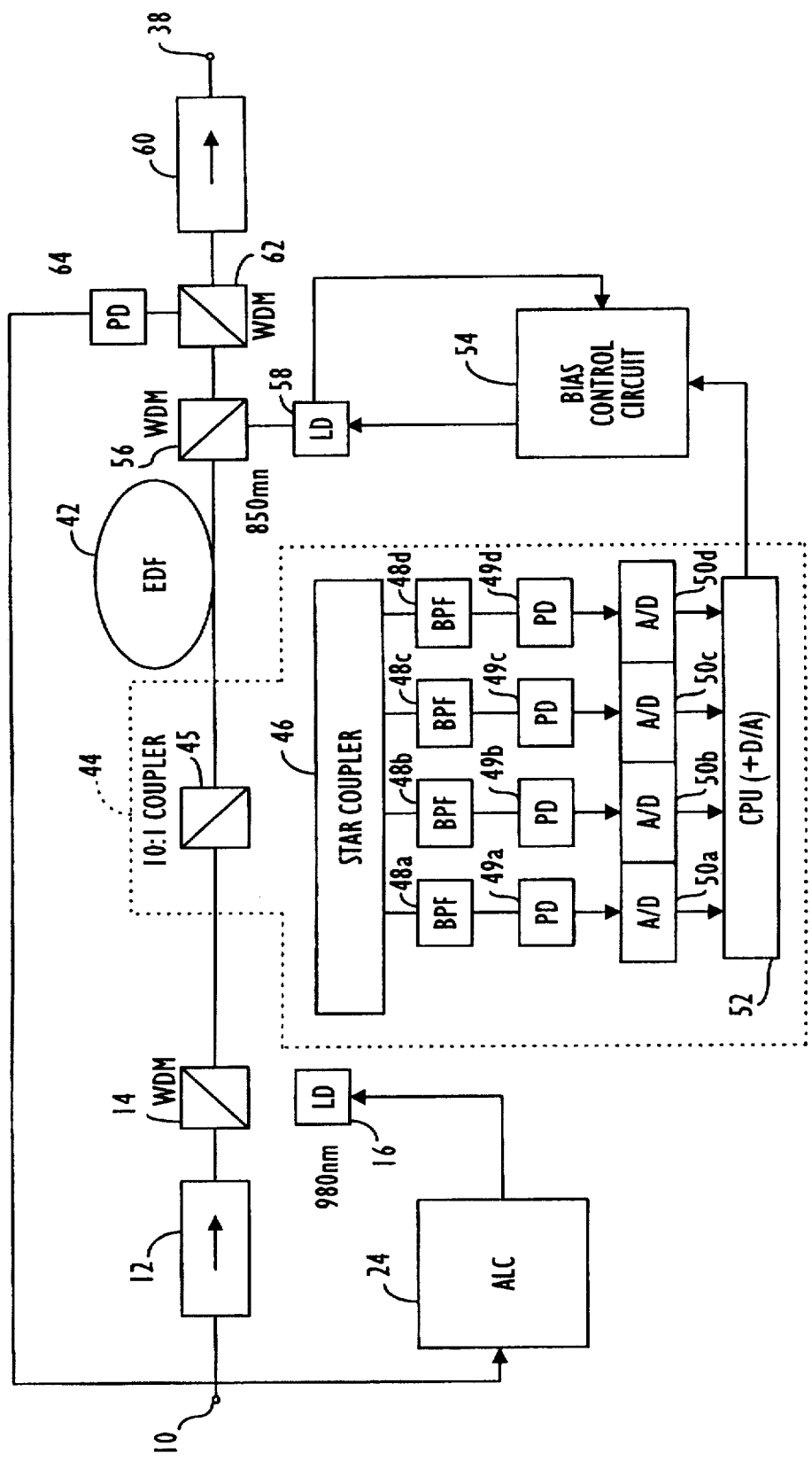
FIG. 6 is a block diagram of a light amplifier according to a fourth embodiment of the present invention.

FIG. 6 is a block diagram of a light amplifier according to a fourth embodiment of the present invention. In FIG. 6, parts that are the same as those shown in FIG. 4 are given the same reference numbers. The signal light having a wavelength in the 1550 nm applied to the light input terminal 10 is supplied to the mirror 14 through the light isolator 12. The mirror 14 combines the signal light with the exciting light having a wavelength of 980 nm different from that of the signal light, the exciting light being supplied from the laser diode 16. The signal light with the exciting light combined is supplied to the light measuring part 44.

The light measuring part 44 is made up of the photocoupler 45, the start coupler 46, the light band-pass filters 48a–48d, photodiodes 49a–49d, A/D converters 50a–50d, and the CPU 52, as has been described previously.

The light band-pass filters 48a–48d are optical filters having a half-value width of 1 nm, which allow the wavelengths 1540 nm, 1550 nm, 1560 nm and 1570 nm to pass, respectively. Spontaneously emitted lights from the respective light band-pass filters 48a–48d are input to the photodiodes 47a–47d, which detect the respective light intensities. The intensities of the spontaneous emission lights in the respective wavelength bands are digitized by the A/D converters 50a–50d, and are then applied to the CPU 52.

The CPU 52 calculates the wavelength (peak wavelength) at which the maximum value can be obtained when fitting the light intensities of the respective bands to a three-order function by means of the least square method. Then, the CPU 52 supplies a bias control circuit 54 (which corresponds to a third control part) with peak wavelength information which indicates the value of the peak wavelength and the output light intensity.

Most of the signal light separated by the photocoupler 45 is supplied to the erbium-doped fiber 42, which forms a light amplifier in cooperation with the laser diode 16 and the mirror 14. The amplified signal light is applied to the mirror 56. The erbium-doped fiber 42 is supplied with the exciting light having a wavelength of 850 nm from the laser diode 58 via the mirror 56. The exciting light controls the hole burning or ESA of the erbium-doped fiber 42.

The mirror 56 combines the signal light with the exciting light having a wavelength of, for example, 810 nm supplied from the laser diode 58 so as to cause the ESA or hole burning. The pack power dependent on the intensity of the exciting light emitted from the laser diode 58 is supplied to the bias control circuit 54. Further, the signal light output from the mirror 56 is output to the light output terminal 38 through the mirror 62 and the light isolator 60 used to prevent oscillation.

Part of the signal light separated by the mirror 62 is supplied to a photodiode 64, which detects the intensity of the received signal light. The automatic level control circuit 24 is supplied with the detected light intensity, and controls the intensity of the exciting light emitted from the laser diode 16 so that the intensity of the output light from the erbium-doped fiber 42 is made constant.

The bias control circuit 54 controls the output of the laser diode 58 in the state in which the output light is subjected to the automatic level control based on the back power so that the wavelength obtained at the maximum value of the ASE component is not changed.

Even in the fourth embodiment of the present invention, it is possible to operate the light amplifier in the state in which the inverted population coefficient is constant by comparing the intensities of three or more spontaneous emission lights having different wavelengths and performing fitting of the intensities by the least square method which uses a function having an order of an integer equal to or less than the number of waveform measuring points. It can be seen from equation (1) that the wavelength-dependence of the gain is determined only by the inverted population coefficient. Hence, by using the above principle, it is possible to realize the light amplifier in which the wavelength-dependence of the gain is not varied independently of the input light.

In the embodiment shown in FIG. 4 the ASE spectrum shape is observed by monitoring the output light of the erbium-doped fiber 42, while in the embodiment shown in FIG. 6 the ASE spectrum traveling in the reverse direction with respect to the traveling direction of the signal light is observed. Hence, there is a particular advantage in which the signal light little enters the light measuring part 44 and thus there is no limitation regarding the wavelength of the light used as the signal light.

Figure 7:
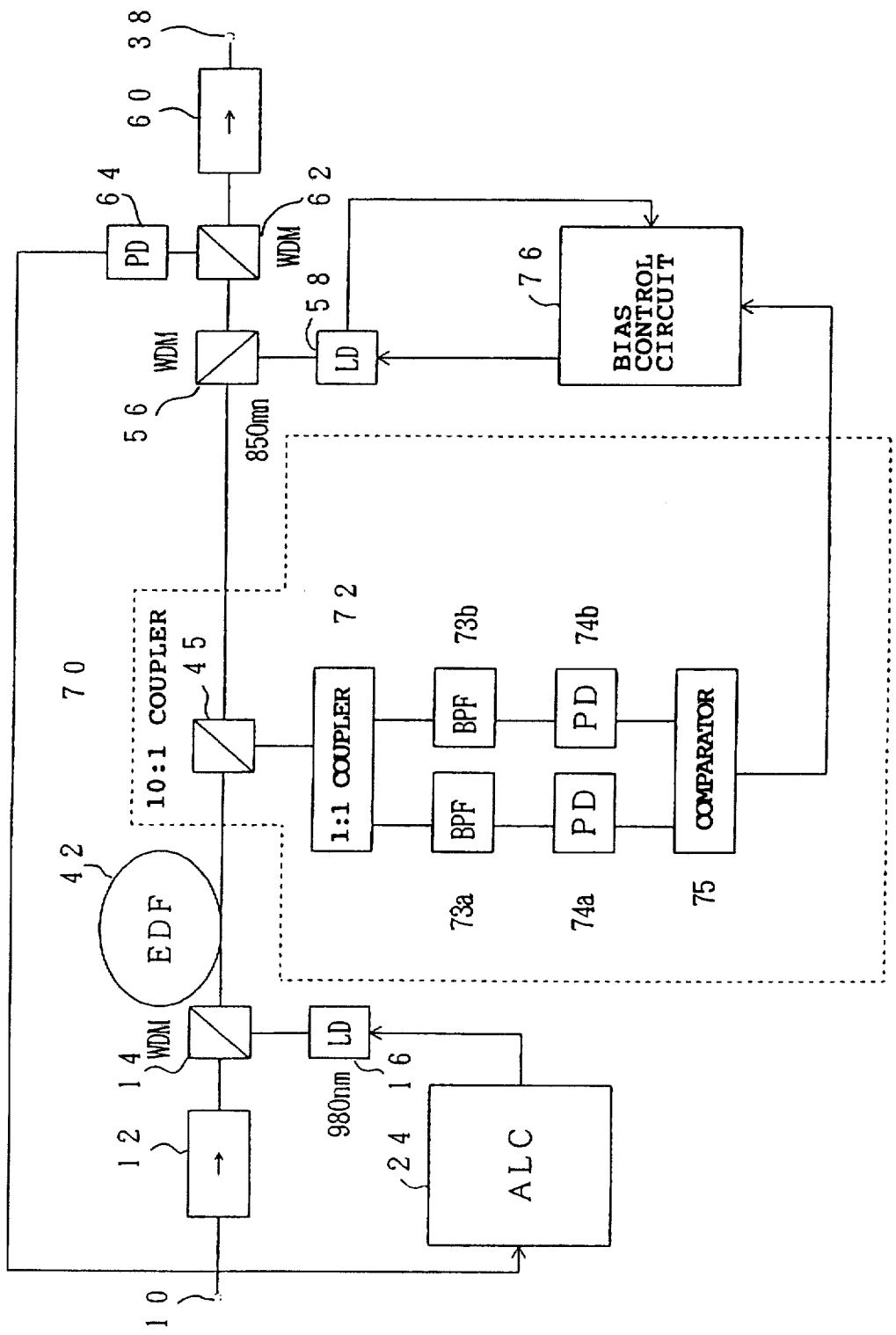
FIG. 7 is a block diagram of a light amplifier according to a fifth embodiment of the present invention.

FIG. 7 is a block diagram of a light amplifier according to a fifth embodiment of the present invention. In FIG. 7, parts that are the same as those shown in FIG. 6 are given the same reference numbers. The signal light having a wavelength in the 1550 nm applied to the light input terminal 10 is supplied to the mirror 14 through the light isolator 12. The mirror 14 combines the signal light with the exciting light having a wavelength of 980 nm different from that of the signal light and supplied from the laser diode 16. The combined light is supplied to the erbium-doped fiber 42.

The erbium-doped fiber 42 forms the light amplifier in cooperation with the mirror 14 and the laser diode 16. The amplified signal light is supplied to a light measuring part 70.

The erbium-doped fiber 42 is supplied to an exciting light having a wavelength of 850 nm from the laser diode via the mirror 56, so that the hole burning or ESA of the erbium-doped fiber 42 is controlled. The light measuring part 70 is made up of the photocoupler 45, a photocoupler 72, light band-pass filters 73a and 73b, photodiodes 74a and 74b, and a comparator 75. Part of the signal light separated by the photocoupler 45 is made to branch into two components by means of the photocoupler 46. Then, the two light components are respectively supplied to the light band-pass filters 73a and 73b.

The light band-pass filters 73a and 73b are optical filters having a half-value width of 1 nm which respectively allow 1550 nm and 1560 nm lights to pass therethrough. The spontaneous emission lights respectively passing through the light band-pass filters 73a and 73b are applied to the photodiodes 74a and 74b, which detect the intensities of the received lights. The intensities of the spontaneous emission lights in the respective bands are compared by the comparator 75, which supplies the difference therebetween to a bias control circuit 76.

Most of the signal light separated by the photocoupler 24 is supplied to the mirror 56, which combines the signal light with the exciting light of a wavelength of 850 nm supplied from the laser diode 58 in order to cause the hole burning or ESA. The back power dependent on the intensity of the exciting light from the laser diode 58 is supplied to the bias control circuit 76. Further, the signal light output from the mirror 56 passes through the mirror 62 and the light isolator 60 used to prevent oscillation, and is output via the light output terminal 38.

Part of the signal light separated by the mirror 62 is supplied to the photodiode 64, which detects the intensity of the signal light. The ALC circuit 24 is notified of the detected light intensity, and controls the intensity of the exciting light emitted from the laser diode 16 so that the intensity of the output light of the erbium-doped fiber 42 is constant.

The bias control circuit 76 controls the output of the laser diode 58 on the basis of the comparison result obtained at the comparator 75 in the state in which the output light is subjected to the automatic level control so that the shape of the ASE spectrum is not changed. For example, if the output values of the photodiodes 74a and 74b are the same, a given ASE spectrum shape is obtained. The output of the photodiode 74a is greater than that of the photodiode 74b, there is an excessive number of elements or ions related to the light amplifying. In this case, the output of the laser diode 58 is increased in order to increase the amount of ESA or hole burning and thus equalize the output values of the photodiodes 74a and 74b.

That is, it is possible to operate the light amplifier in the state in which the inverted population coefficient is constant. Hence, it is possible to vary the gain of the amplifier in the state in which the value of the inverted population coefficient $N_2/(N_2+N_1)$ is constant. The wavelength-dependence of the gain is determined only by the inverted population coefficient from equation (1), and it is thus possible to realize the light amplifier in which there is no variation in the wavelength-dependence of the gain independently of the input light. The number of wavelength points to be monitored may be an arbitrary number equal to or greater than 1 on the basis of the ASE shape.

Figure 8:
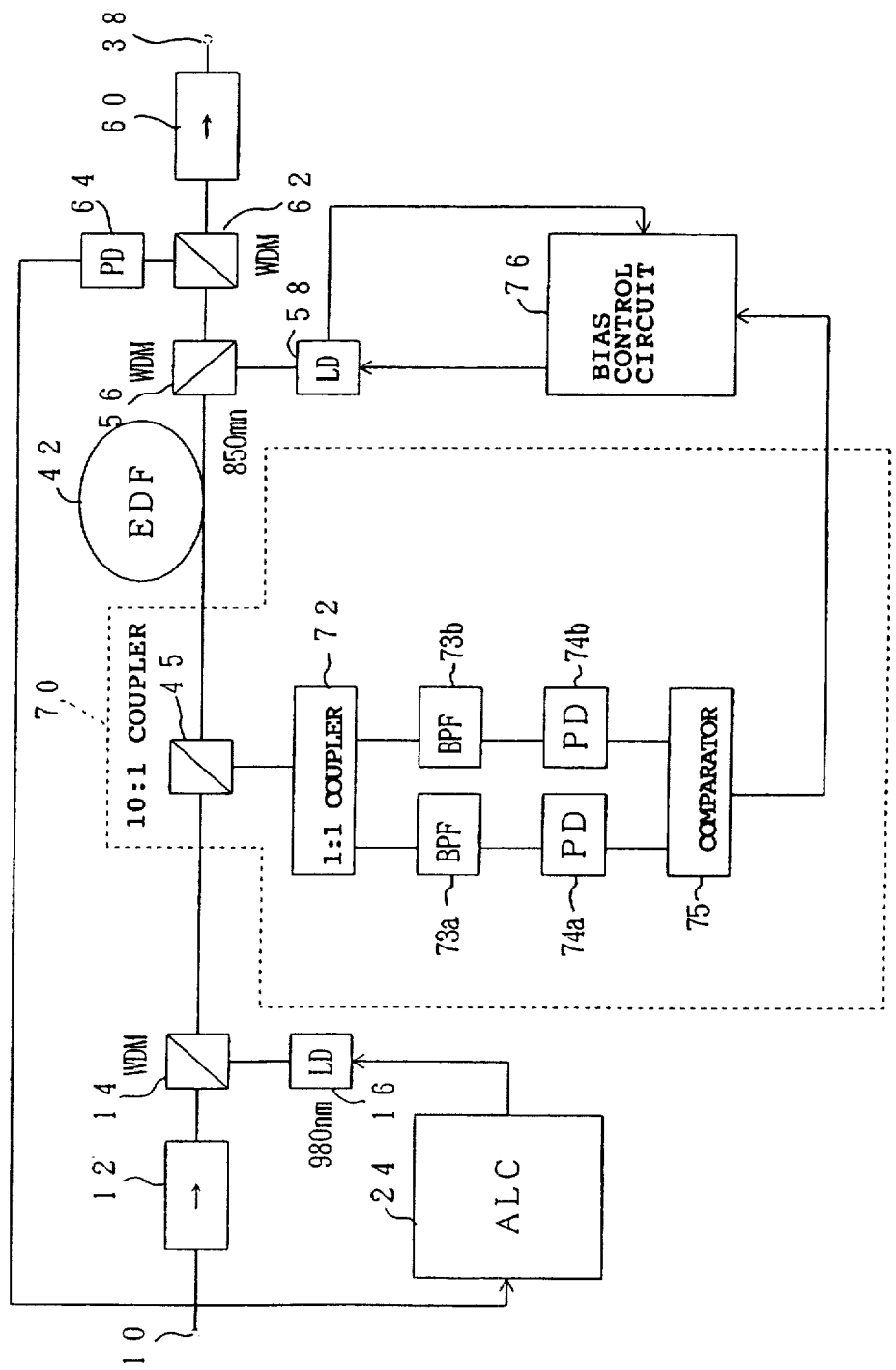
FIG. 8 is a block diagram of a light amplifier according to a sixth embodiment of the present invention.

FIG. 8 is a block diagram of a light amplifier according to a sixth embodiment of the present invention. In FIG. 8, parts that are the same as those shown in FIG. 7 are given the same reference numbers. The structure shown in FIG. 8 differs from that shown in FIG. 7 in that the light measuring part 70 is located at a stage in advance of the erbium-doped fiber 42. This is the same relation as that between the structures shown in FIGS. 4 and 6.

Even according to the embodiment shown in FIG. 8, it is possible to operate the light amplifier in the state in which the inverted population coefficient is constant. Hence, it becomes possible to operate the gain of the amplifier in the state in which the inverted population coefficient $N_2/(N_2+N_1)$ is constant. The waveform-dependence of the gain is determined only by the inverted population coefficient from equation (1). Hence, by utilizing the above principle, it is possible to realize the light amplifier in which the wavelength-dependence of the gain is not changed independently of the input light. The number of wavelength points to be monitored may be an arbitrary number equal to or greater than 1 on the basis of the ASE shape.

In the embodiment shown in FIG. 7, the shape of the ASE spectrum is observed by monitoring the output light of the erbium-doped fiber 42, while in the embodiment shown in FIG. 8 the ASE spectrum traveling in the reverse direction with respect to the traveling direction of the signal light is observed. Hence, there is a particular advantage in which the signal light little enters the light measuring part 44 and thus there is no limitation regarding the wavelength of the light used as the signal light.

Figure 9:
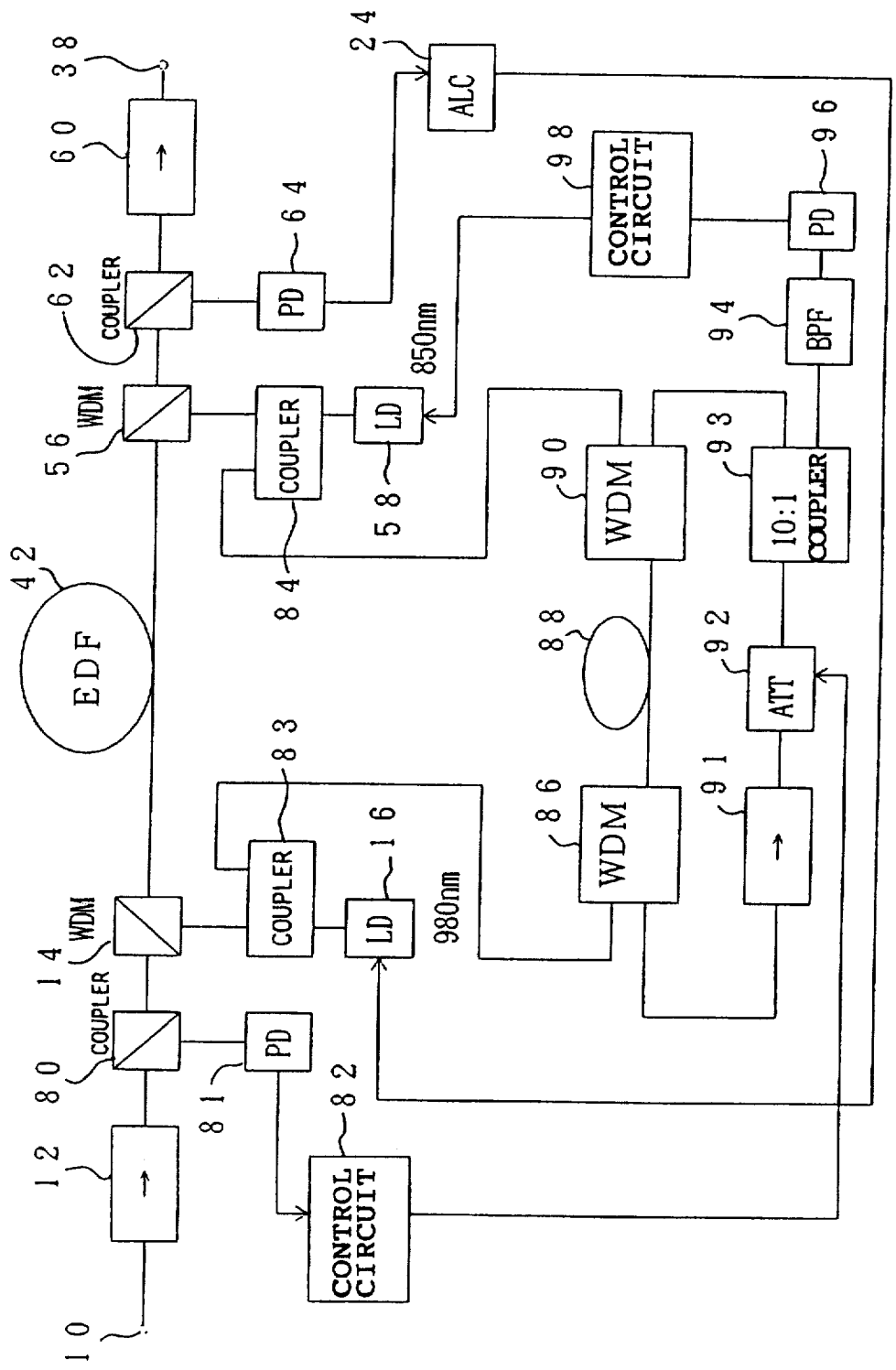
FIG. 9 is a block diagram of a light amplifier according to a seventh embodiment of the present invention.

FIG. 9 is a block diagram of a light amplifier according to a seventh embodiment of the present invention. In FIG. 9, parts that are the same as those shown in FIG. 2 are given the same reference numbers. The signal light having a wavelength in the 1550 nm is applied to the light input terminal 10, and is then applied to a coupler 80 via the light isolator 12 used to prevent oscillation. The coupler 80 supplies a photodetector 81 with part of the signal light. The photodetector 81 detects the intensity of the received signal light, and notifies a control circuit of the detected light intensity.

Most of the signal light is supplied to the mirror 14 from the coupler 80. The mirror 14 is supplied, through a coupler 83, with the exciting light having a wavelength of, for example, 980 nm generated by the laser diode 16. The mirror 14 combines the signal light with the exciting light, and supplies the combined wave to the erbium-doped fiber 42, which has a relatively short length and amplifies the received signal light. The erbium-doped fiber 42 is supplied, through a coupler 84 and the mirror 56, with the exciting light having a wavelength of, for example, 850 nm generated by the laser diode 58, so that the hole burning or ESA takes place.

Part of the exciting light having a wavelength of 980 nm separated by the coupler 83 is combined with a loop light by means of a wavelength distribution mirror 86. The combined light is supplied to an erbium-doped fiber 88, which forms the fourth light amplifier. Part of the 850 nm exciting light separated by the coupler 84 is combined with the loop light by means of a wavelength distribution mirror 90. The combined light is supplied to the erbium-doped fiber 88. An ASE cyclic system is formed by the mirror 86, a light isolator 91, an attenuator (ATT) 92, a coupler 93, the mirror 90, and the erbium-doped fiber 88. In the ASE cyclic system, the level of a wavelength having a large gain is increased so that a peak is formed.

When the outputs of the laser diodes 16 and 58 are at respective constant levels, the loop gain of the ASE cyclic system is varied by changing the amount of attenuation at the attenuator 92 by means of the control circuit 82 in accordance with the intensity of the input signal light. Due to the input-light-intensity-dependence of the wavelength-dependence of the gain, the wavelength of the peak in the ASE cyclic system is varied.

Now, the pre-adjustment is performed by varying the intensity of the input signal light so that the wavelength of the peak of the gain of the erbium-doped fibers is not changed. This is done by adjusting the output value of the laser diode 16 and the output value of the laser diode 58. The amount of attenuation of the attenuator 92 is measured so that the peak wavelength of the ASE cyclic system is not changed when adjusting the laser diodes 16 and 58. The information thus obtained (the amount of attenuation of the attenuator 92 and the intensity of the input signal light) is stored in the control circuit 82.

Part of the loop light separated by the coupler 93 of the ASE cyclic system is supplied to a photodetector 96 via a band-pass filter 94 which allows the peak wavelength of the ASE cyclic system to pass therethrough. The photodetector 96 detects the intensity of the peak wavelength, and notifies the control circuit 98 (which functions as the fourth control part) of the detected light intensity. The control circuit 98 controls the laser diode 58 so that the maximum light intensity can be obtained at the peak wavelength.

The output light of the mirror 56 passes through the coupler 62 and the light isolator 60, and is output via the terminal 38. Part of the output light extracted by the coupler 62 is supplied to the photodetector 64, which detects the intensity of the output light. The automatic level control circuit 24, which functions as the fourth control part, controls the laser diode 16 on the basis of the detected light intensity so that the intensity of the output light is constant.

That is, the intensity of the exciting lights respectively emitted from the laser diodes 16 and 58 are controlled so that the ASE peak wavelength is the same as that obtained in the adjustment by varying the amount of attenuation of the attenuator 92 on the basis of the intensity of the input light. Hence, the wavelength-dependence of the gain of the light amplifier becomes independent of the intensity of the input light.

The laser diodes 16 and 58 are respectively controlled by the automatic level control circuit 24 and the control circuit 98, rather than a control process in which the control amounts related to the values of the intensity of the input light. This is intended to prevent a change in the performance of the light amplifier due to age deterioration of the performances of the laser diodes 16 and 58.

According to the seventh embodiment of the present invention, it is possible to make the light amplifier operated in the state in which the inverted population of the third light amplifying part is constant and to thereby suppress a variation in the wavelength-dependence of the gain due to the intensity of the input light. This is achieved by forming the ASE cyclic system including the fourth amplifier which operates with the light intensity proportional to the output light of the erbium-doped fiber 42 serving as the third light amplifying part, and controlling the intensity of the fourth exciting light so that the peak wavelength of the ASE cyclic system is not varied in the state in which the third amplifier has the optimal wavelength-dependence of the gain.

Figure 10:
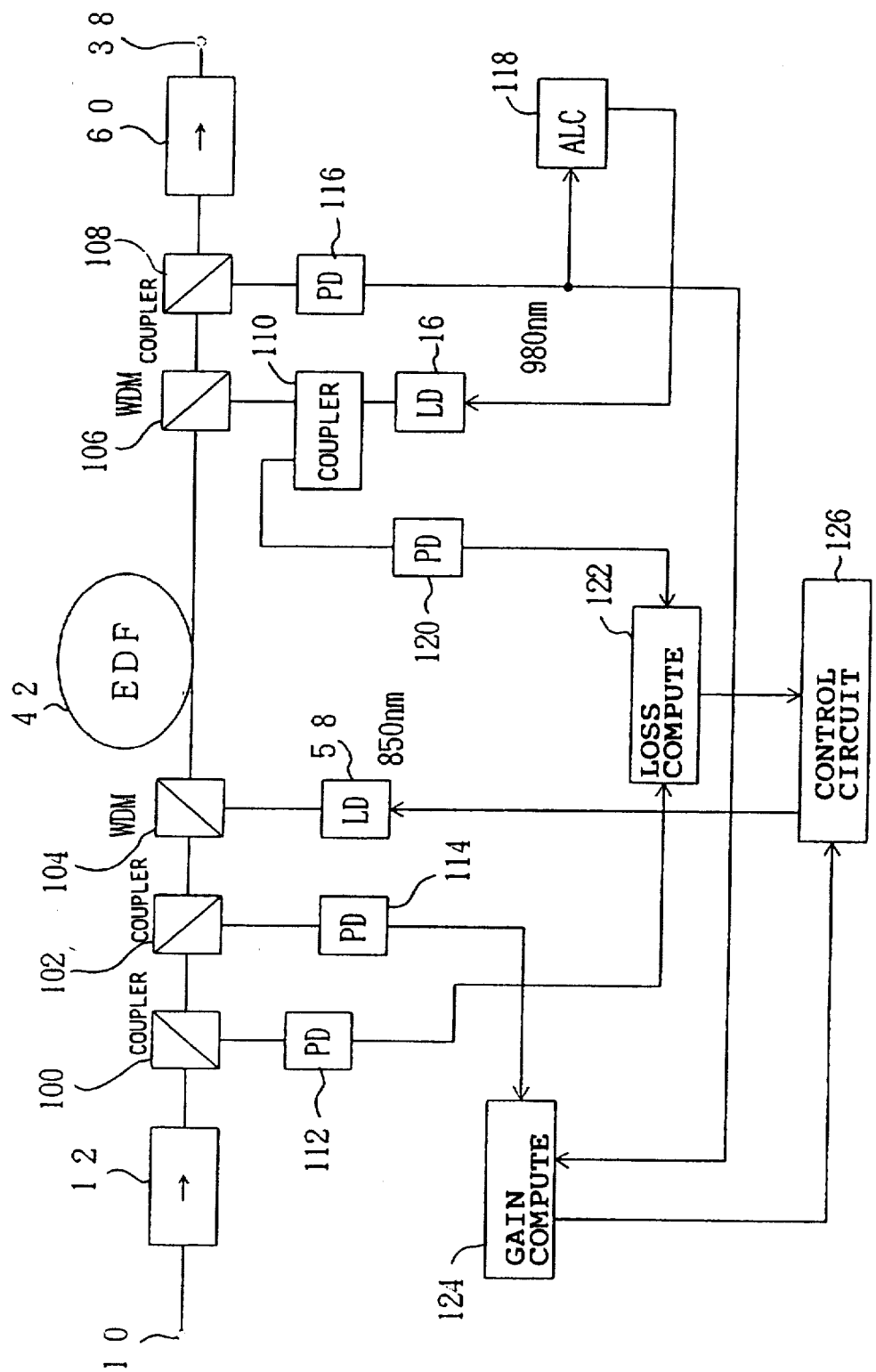
FIG. 10 is a block diagram of a light amplifier according to an eighth embodiment of the present invention.

FIG. 10 is a block diagram of a light amplifier according to an eight embodiment of the present invention. In FIG. 10, parts that are the same as those shown in FIG. 2 are given the same reference numbers. In FIG. 10, the signal light which is applied to the light input terminal 10 and has a wavelength falling in, for example, 1550 nm passes through the light isolator 12, and is supplied to a wavelength distribution mirror 104 via couplers 100 and 102. The mirror 140 combines the signal light with the 810 nm exciting light generated by the laser diode 58, and the combined light is supplied to the erbium-doped fiber 42.

The mirror 106 is supplied, via a coupler 110, with the 980 nm exciting light generated by the laser diode 16, and combines the signal light with the supplied exciting light. In the erbium-doped fiber 42, the signal light is amplified by the 980 nm exciting light. The hole burning or ESA is caused by the 850 nm exciting light. The signal light amplified by the erbium-doped fiber 42 is output via the mirror 106, and passes through a coupler 108 and the light isolator 60 used to prevent oscillation. Then, the signal light is output via the light output terminal 38.

Part of the 980 nm exciting light is separated by the coupler 100, and a photodetector 112 detects the intensity of the exciting light. Part of the input signal light is separated by the coupler 102, and the intensity thereof is detected by a photodetector 114.

Part of the output signal light is separated by the coupler 108, and the intensity thereof is detected by a photodetector 116. An automatic level control circuit 118 controls the laser diode 16 so that the intensity of the output signal light is constant. Part of the 980 nm exciting light separated by the coupler 110 is supplied to the photodetector 120, which detects the intensity of the exciting light.

A loss computation part 122 computes a loss of the 980 nm exciting light from the intensities of the output lights of photodetectors 120 and 112. A gain computation part 124 computes the gain of the signal light from the intensities of the lights detected by the photodetectors 116 and 114. A control circuit 126 obtains the ratio of the logarithm of the loss of the exciting light to the logarithm of the gain of the signal light, and thereby controls the laser diode 58 so that the inverted population coefficient is constant and the wavelength-dependence of the gain is not varied independently of the intensity of the input light. A sixth control part is formed by the loss computation part 122, the gain computation part 124 and the control circuit 126.

The loss "Loss" of the exciting light (980 nm) can be expressed by equation (2):

$$\text{Loss} = A \exp\left[\int_0^L \sigma a(\lambda) N_1 \, dz\right] \quad (2)$$

The gain G and the loss Loss can also be expressed as follows:

$$G = \exp((\sigma a + \sigma e)N - \sigma a T)L \quad (3)$$
$$= \exp((\sigma a + \sigma e)t - \sigma a)TL$$

$$\text{Loss} = \exp \sigma ap(1-t)TL \quad (4)$$

$$t = N_2/(N_2 + N_1)$$

where N and T are respectively the averages of $N_2$ and $N_T$ in the longitudinal direction, t is the inverted population coefficient, and $\sigma ap$ is the absorption cross-section of the amplifying medium with respect to pump light.

From the above, the following equation stands:

$$\log(G)/\log(\text{Loss}) = [(\sigma a + \sigma e)/\sigma ap] \times [t/(1-t)]$$
$$-(\sigma a/\sigma ap) \times [1/(1-t)] \quad (5)$$

In equation (5), σa and σe are constants and the inverted population coefficient t is made constant by setting Log(G)/Log(Loss).

In the eighth embodiment of the present invention, the intensity of the exciting light is controlled by referring to the gain of the signal light and the loss of the exciting light. Hence, it is possible to perform the light amplifying operation in the state in which the inverted population coefficient is constant and suppress the input-light-intensity-dependence of the wavelength-dependence of the gain.

Figure 11:
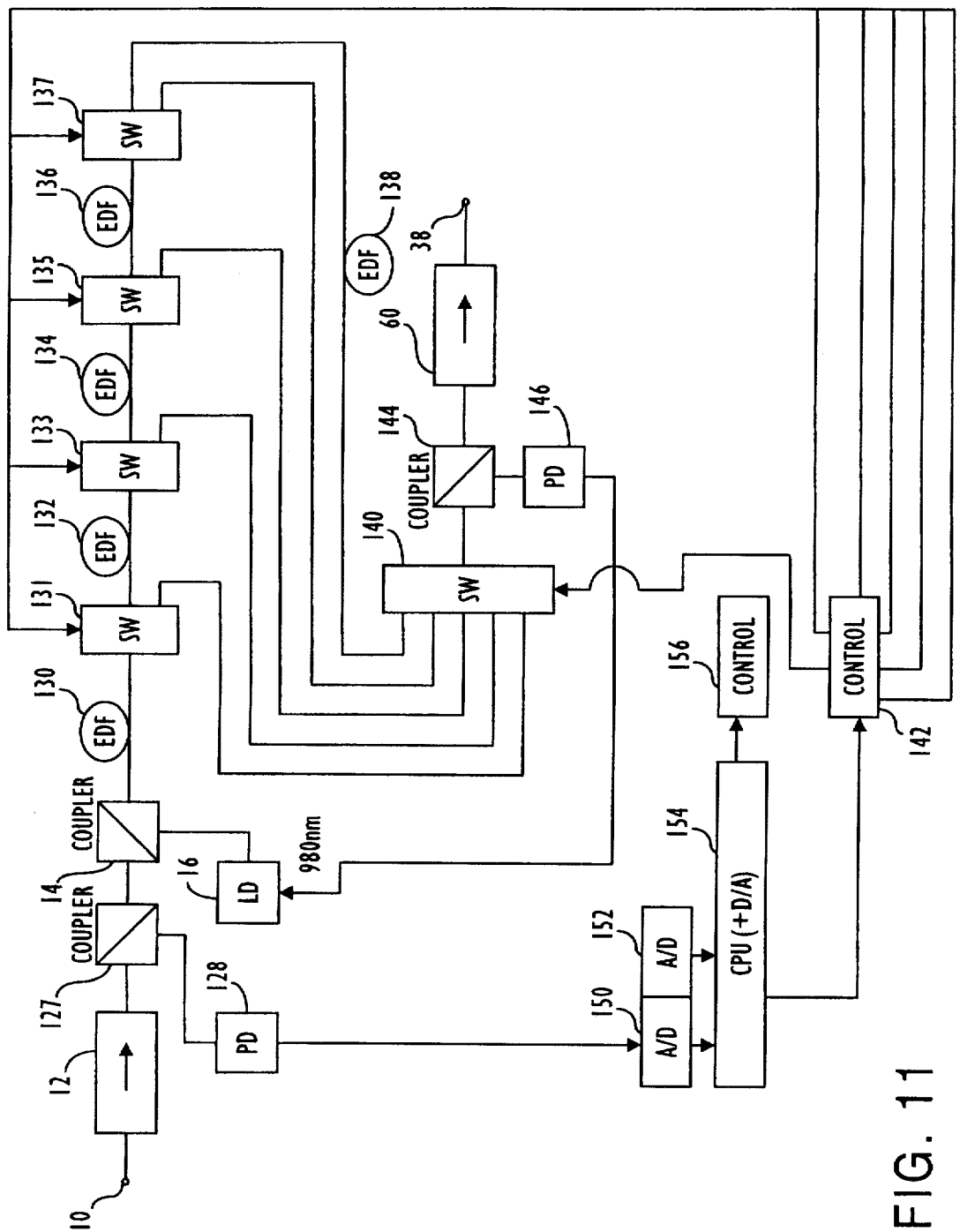
FIG. 11 is a block diagram of a light amplifier according to a ninth embodiment of the present invention.

FIG. 11 is a block diagram of a light amplifier according to a ninth embodiment of the present invention. In FIG. 11, parts that are the same as those shown in FIG. 2 are given the same reference numbers. In FIG. 11, the signal light having a wavelength falling in the 1550 nm is applied to the light input terminal 10, and is supplied to a coupler 127 via the light isolator 12. Part of the signal light separated by the coupler 127 is supplied to a photodetector 128, which detects the intensity of the input signal light. The signal light mostly passing through the coupler 127 is supplied to the wavelength distribution mirror 14, which combines the signal light with the 980 nm exciting light emitted from the laser diode 16. The combined light is supplied to an erbium-doped fiber 130.

The erbium-doped fibers 130, 132, 134, 136 and 138 are connected in series via switches 131, 133, 135 and 137. Each of the switches 131, 133, 135 and 137 connects the erbium-doped fiber located at the front stage thereof to either the erbium-doped fiber located at the rear stage or a switch 140. The above switching operations of the switches 131, 133, 135 and 137 are controlled in accordance with control signals output from a control circuit 142. The ratio of the lengths of the erbium-doped fibers 130, 132, 134, 136 and 138 is equal to, for example, 5:1:1:1:1. The length of the erbium-doped fiber contributing to amplifying of the light can be varied by the switching operations of the switches 131, 133, 135 and 137. These erbium-doped fibers and switches form a fifth light amplifying part.

The signal light amplified by any of the erbium-doped fibers 130, 132, 134, 136 and 138 is output via the switch 140 controlled by the control circuit 142, and is then supplied to a coupler 144. The coupler 144 outputs most of the signal light to the light output terminal 38 via the light isolator 60 used to prevent oscillation. Part of the signal light separated by the coupler 144 is supplied to a photodetector 146, which detects the intensity of the output signal light.

A/D converters 150 and 152 respectively digitize the values of the intensities of the input signal light and output signal light respectively detected by the photodetectors 128 and 146, and output digitized values to a CPU 154. The CPU 154 sends an instruction based on the intensity of input signal light to the control circuit 142, which controls the switches 131, 133, 135 and 137 to vary the length of the erbium-doped fiber for light amplification. As the intensity of the input signal light becomes greater, the length of the erbium-doped fiber is made shorter. Thereafter, a control circuit 156, which functions as an eighth control part, controls the laser diode 16 so that the intensity of the output signal light is constant.

In the ninth embodiment of the present invention, it is possible to regulate the total amount of elements or ions really amplifying the light at an approximately constant level independently of the intensity of the input signal light and to hence suppress the input-light-intensity-dependence of the waveform-dependence of the gain.

Figure 12:
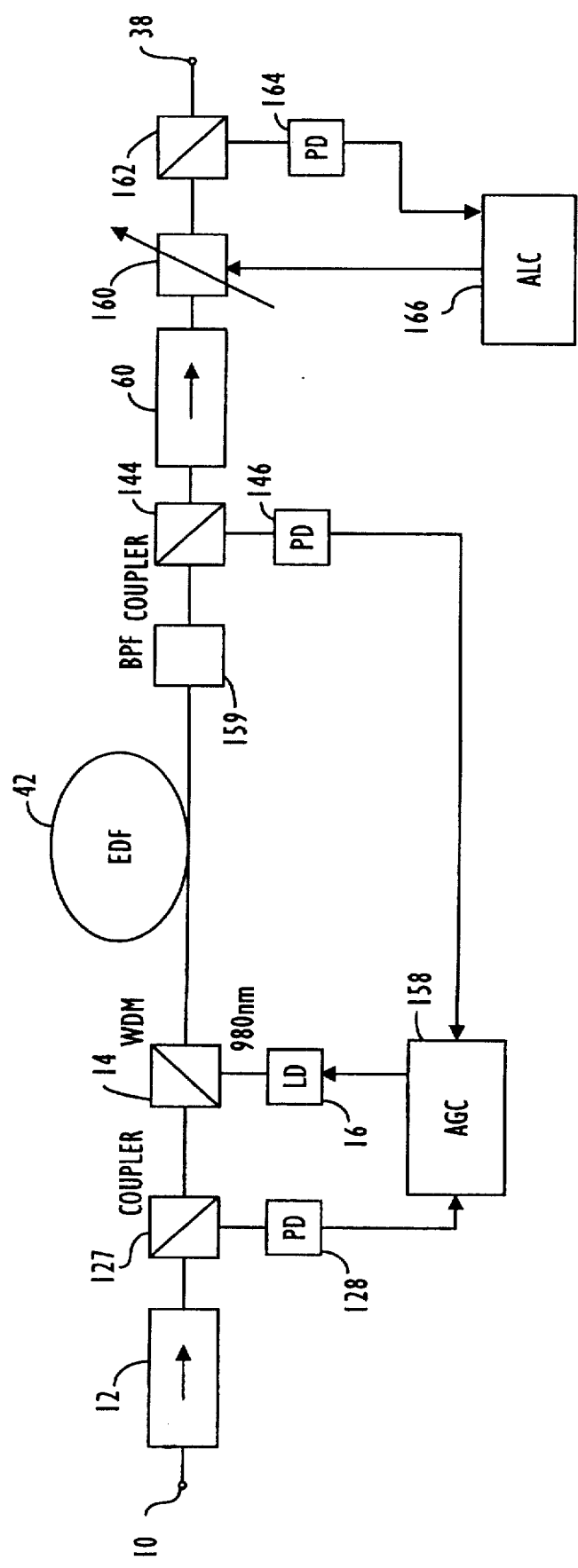
FIG. 12 is a block diagram of a light amplifier according to a tenth embodiment of the present invention.

FIG. 12 is a block diagram of a light amplifier according to a tenth embodiment of the present invention. In FIG. 12, parts that are the same as those shown in FIG. 4 or FIG. 11 are given the same reference numbers. In FIG. 12, the signal light having a wavelength in the 1550 nm band is applied to the light input terminal 10, and is supplied to a coupler 127 via the light isolator 12. Part of the signal light separated by the coupler 127 is supplied to a photodetector 128, which detects the intensity of the input signal light. Most of the signal light passing through the coupler 127 is supplied to the wavelength distribution mirror 14, which combines the received signal light with the 980 nm exciting light generated by the laser diode 16. The combined light is supplied to the erbium-doped fiber 42.

A band-pass filter 159 eliminates unwanted components from the signal light amplified by the erbium-doped fiber 42, the output signal of the filter 159 being supplied to the coupler 144. The coupler 144 supplies most of the signal light to an attenuator 160 through the light isolator 60 used to prevent oscillation. Part of the signal light separated by the light coupler 144 is supplied to the photodetector 146, which detects the intensity of the output signal light.

An automatic gain control circuit 158, which functions as a ninth control part, controls the laser diode 16 so that the ratio of the intensity of the output signal light detected by the photodetector 146 to that of the input signal light detected by the photodetector 128 is constant, that is, the gain is constant.

The output signal light attenuated by the attenuator 160 is supplied to a coupler 162, which outputs most of the received output signal light to the light output terminal 38. Part of the output signal light separated by the coupler 162 is supplied to a photodetector 164, which detects the intensity of the output signal light. An automatic level control circuit 166, which functions as a tenth control part, controls the attenuator 160 so that the intensity of the output signal light is constant. The use of the attenuator 160 is intended to canceling a variation of the intensity of the signal light amplified by the erbium-doped fiber due to a variation in the intensity of the input signal light while the gain of the erbium-doped fiber 42 is constant.

Figure 13:
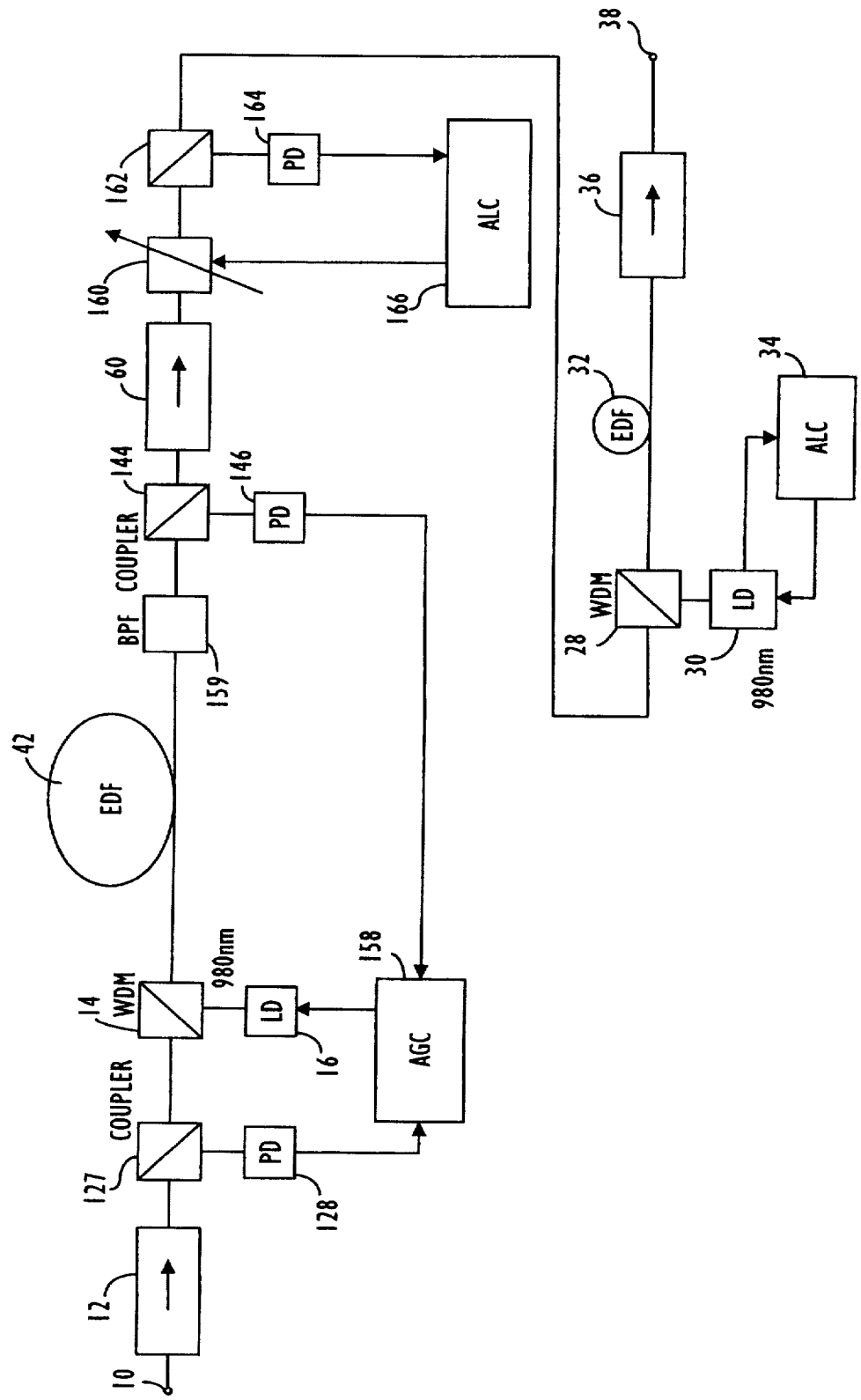
FIG. 13 is a block diagram of a light amplifier according to an eleventh embodiment of the present invention.

FIG. 13 is a block diagram of a light amplifier according to an eleventh embodiment of the present invention in which the configuration shown in FIG. 2 is modified so that the front stage between the light input terminal 10 and the light isolator 26 shown in FIG. 2 is replaced by the configuration shown in FIG. 12. In FIG. 13, the 1550 nm signal light is applied to the light input terminal 10, and is supplied to the coupler 127 via the light isolator 12. Part of the signal light separated by the coupler 127 is supplied to the photodetector 128, which detects the intensity of the input signal light. The most of the signal light passing through the coupler 127 is supplied to the wavelength distribution mirror 14, which combines the signal light with the 980 nm exciting light generated by the laser diode 16. The combined light is supplied to the erbium-doped fiber 42. The erbium-doped fiber 42 has a relatively short length and is excessively excited by the exciting light from the laser diode 16.

The band-pass filter 159 eliminates unwanted wavelength components from the signal light amplified by the erbium-doped fiber 42, the output signal thereof being applied to the coupler 144. The coupler 144 supplies most of the received signal light to the attenuator 160 via the light isolator 60. Part of the signal light separated by the light coupler 144 is supplied to the photodetector 146, which detects the intensity of the output signal light.

The automatic gain control circuit 158 controls the laser diode 16 so that the ratio of the intensity of the output signal light detected by the photodetector 146 to that of the input signal light detected by the photodetector 128 is constant, that is, the gain is constant.

The output signal light attenuated by the attenuator 160 is supplied to the coupler 162, which outputs most of the received output signal light to the light output terminal 38. Part of the output signal light separated by the coupler 162 is supplied to the photodetector 164, which detects the intensity of the output signal light. The automatic level control circuit 166 controls the attenuator 160 so that the intensity of the output signal light is constant. Hence, the intensity of the output light of the erbium-doped fiber 42 is optimized so that it becomes equal to the optimal value for the next-stage light amplifier including the erbium-doped fiber 32.

The most of the signal light separated by the light coupler 162 is supplied to the mirror 28, which combines the signal light with the 980 nm or 1480 nm exciting light supplied from the laser diode 16. The combined light is supplied to the erbium-doped fiber 32. The back power based on the intensity of the exciting light from the laser diode 16 is supplied to the automatic level control circuit 34. The circuit 34 controls the laser diode 30 so that the intensity of the exciting light emitted from the laser diode 30 is constant. The erbium-doped fiber 32 forms a light amplifier in cooperation with the mirror 28 and the laser diode 30, and has a larger amount of erbium or a longer length than the erbium-doped fiber 42. The erbium-doped fiber 32 is supplied with the signal light having the intensity optimized by the erbium-doped fiber 42 and the exciting light having the optimized intensity from the laser diode 30. That is, the intensity of the input light to the erbium-doped fiber 32 is made constant. The signal light amplified by the erbium-doped fiber 32 passes through the light isolator 36 used to prevent oscillation, and is output to the light output terminal 38.

In the eleventh embodiment of the present invention, the output light of the front-stage light amplifier is amplified by the rear-stage light amplifier having a constant gain, so that the input-light-intensity-dependence of the wavelength-dependence of the gain can be suppressed and a large signal gain can be obtained.

Figure 14:
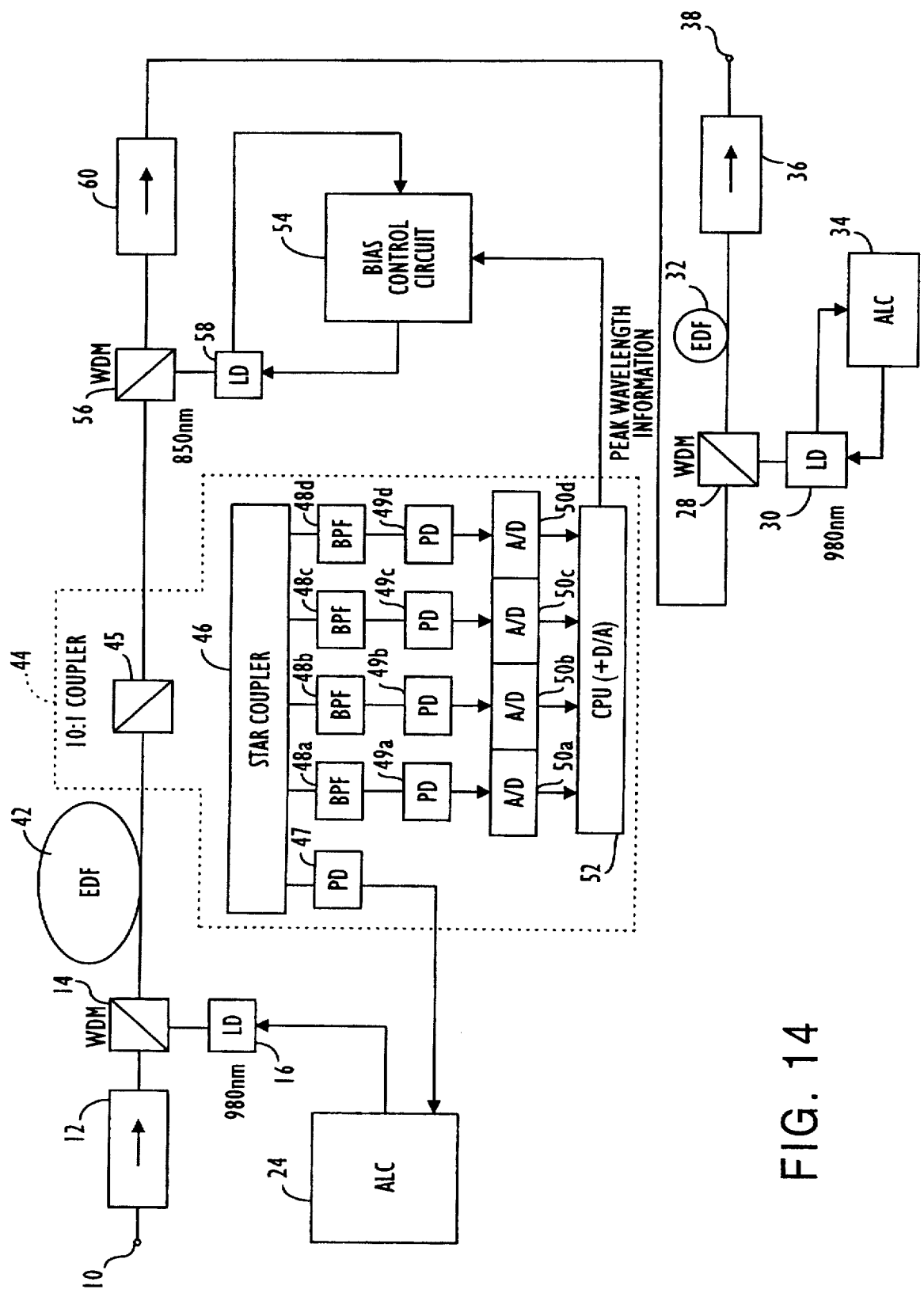
FIG. 14 is a block diagram of a light amplifier according to a twelfth embodiment of the present invention.

FIG. 14 is a block diagram of a light amplifier according to a twelfth embodiment of the present invention in which the configuration shown in FIG. 2 is modified so that the front stage between the light input terminal 10 and the light isolator 26 shown in FIG. 2 is replaced by the configuration shown in FIG. 4. The input signal light in the 1550 nm band applied to the light input terminal 10 passes through the light isolator 12 used to prevent oscillation, and is supplied to the wavelength distribution mirror 14. The mirror 14 is of a fiber type, which combines the signal light with the exciting light having a wavelength of 980 nm different from that of the signal light and supplied from the laser diode 16. The signal with the exciting light combined is supplied to the erbium-doped fiber 42 having a relatively short length. The erbium-doped fiber 42 is excessively excited by the exciting light from the laser diode 16.

The erbium-doped fiber 42 forms the light amplifier in cooperation with the mirror 14 and the laser diode 16. The signal light amplified by the erbium-doped fiber 42 is supplied to the light measuring part 44. The erbium-doped fiber 42 is supplied with the 850 nm exciting light from the laser diode 58 via the mirror 56 whereby the hole burning or the ESA of the erbium-doped fiber 42 is controlled.

The light measuring part 44 is made up of the photocoupler 45, the star coupler 46, the light band-pass filters 48a–48d, the photodiodes 47, 49a–49d, the A/D converters 50a–50d and the CPU 52.

Part of the signal light separated by the photocoupler 45 (equal to, for example, 1/11) is made to branch into five by the star coupler 46, so that the photodiode 47 and the light band-pass fibers 48a–48d receive the respective parts of the signal light.

The photodiode 47 detects the light intensity, which outputs a light intensity signal to the automatic level controller 24. The controller 24 controls the intensity of the exciting light emitted from the laser diode 16 so that the intensity of the output light of the erbium-doped fiber 42 can be controlled to the constant level.

The light band-pass filters 48a–48d are optical filters having a half-value width of 1 nm, which allow the wavelengths 1540 nm, 1550 nm, 1560 nm and 1570 nm to pass, respectively. Spontaneously emitted lights from the respective light band-pass filters 48a–48d are input to the photodiodes 47a–47d, which detect the respective light intensities. The intensities of the spontaneous emission lights in the respective wavelength bands are digitized by the A/D converters 50a–50d, and are then applied to the CPU 52.

The CPU 52 calculates the wavelength (peak wavelength) at which the maximum value can be obtained when fitting the light intensities of the respective bands to a three-order function by means of the least square method. Then, the CPU 52 supplies the bias control circuit 54 with peak wavelength information which indicates the value of the peak wavelength and the output light intensity.

Most of the signal light separated by the photocoupler 45 is supplied to the mirror 56. The mirror 56 combines the signal light with a fourth exciting light having a waveform of 850 nm supplied from the laser diode 58 in order to cause the ESA or hole burning. The back power dependent on the intensity of the exciting light emitted from the laser diode 58 is supplied to the bias control circuit 54. The circuit 54 controls, in the state in which the output light is subjected to the ALC based on the back power, the output of the laser diode 58 on the basis of the peak wavelength information supplied from the CPU 52 so that the wavelength obtained at the maximum value of the ASE is not changed.

By applying the 850 nm light which causes the ESA or hole burning to the erbium-doped fiber 42, the value of $N_2$ at which the induced emission takes place can be controlled. By utilizing the above principle, it is possible to change the gain of the amplifier in the state in which the value of the inverted population coefficient $N_2/(N_2+N_1)$ can be made constant. The inverted population coefficient is a quantity that characterizes the ASE spectrum shape, and therefore it is possible to operate the light amplifier in the state in which the inverted population coefficient is constant, by preventing a variation in the wavelength at which the maximum value is obtained, the maximum value being obtained when comparing the intensities of three or more spontaneous emission lights having different wavelengths and performing fitting of the intensities by the least square method which uses a function having an order of an integer equal to or less than the number of waveform measuring points. It can be seen from equation (1) that the wavelength-dependence of the gain is determined only by the inverted population coefficient. Hence, by using the above principle, it is possible to realize the light amplifier in which the wavelength-dependence of the gain is not varied independently of the input light.

The intensity of the output light of the erbium-doped fiber 42 is optimized so that it has the optimal value of the next-stage light amplifier having the erbium-doped fiber 32.

The signal light output by the mirror 56 passes through the light isolator 60 used to prevent oscillation and is supplied to the mirror 28. The mirror 28 combines the signal light with the 980 nm or 1480 nm exciting light supplied from the laser diode 16, the combined light being applied to the erbium-doped fiber 32. The back power dependent on the intensity of the exciting light from the laser diode 16 is supplied to the automatic level control circuit 34, which controls the laser diode 30 so that the intensity of the exciting light emitted from the laser diode 30 is constant.

The erbium-doped fiber 32 forms a light amplifier in cooperation with the mirror 28 and the laser diode 30, and has a larger amount of erbium or a longer length than the erbium-doped fiber 42. The erbium-doped fiber 32 is supplied with the signal light having the intensity optimized by the erbium-doped fiber 42 and the exciting light having the optimized intensity from the laser diode 30. That is, the intensity of the input light to the erbium-doped fiber 32 is made constant. The signal light amplified by the erbium-doped fiber 32 passes through the light isolator 36 used to prevent oscillation, and is output to the light output terminal 38.

In the twelfth embodiment of the present invention, the output light of the front-stage light amplifier is amplified by the rear-stage light amplifier having a constant gain, so that the input-light-intensity-dependence of the wavelength-dependence of the gain can be suppressed and a large signal gain can be obtained.

Figure 15:
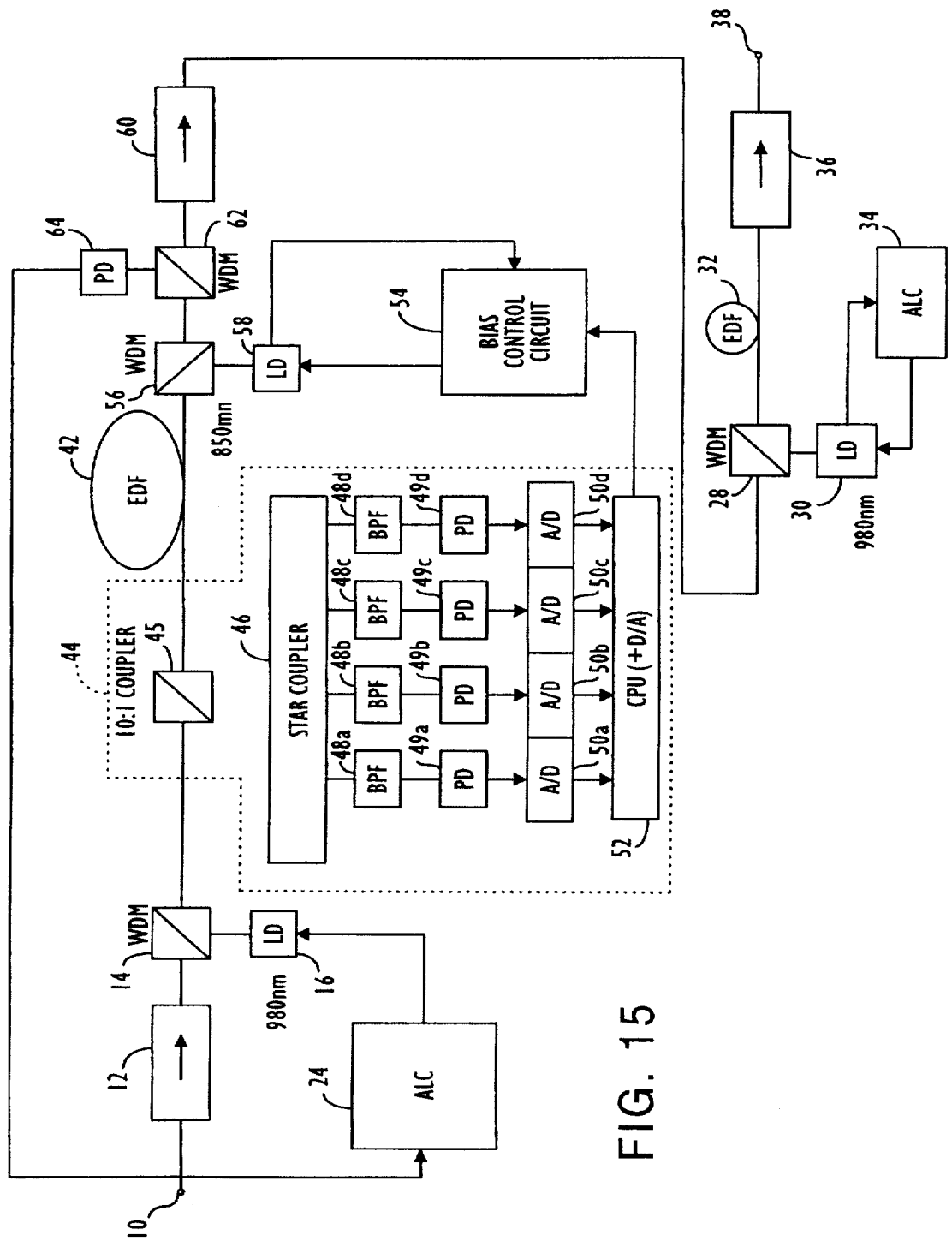
FIG. 15 is a block diagram of a light amplifier according to a thirteenth embodiment of the present invention.

FIG. 15 is a block diagram of a light amplifier according to a thirteenth embodiment of the present invention in which the configuration shown in FIG. 2 is modified so that the front stage between the light input terminal 10 and the light isolator 26 shown in FIG. 2 is replaced by the configuration shown in FIG. 6. The input signal light in the 1550 nm band applied to the light input terminal 10 passes through the light isolator 12 used to prevent oscillation, and is supplied to the wavelength distribution mirror 14. The mirror 14 is of a fiber type, which combines the signal light with the exciting light having a wavelength of 980 nm different from that of the signal light and supplied from the laser diode 16. The signal with the exciting light combined is supplied to the light measuring part 44.

As has been described previously, the light measuring part 44 is made up of the photocoupler 45, the star coupler 46, the light band-pass fibers 48a through 48d, the photodiodes 47, 49a–49d, A/D converters 50a–50d, and the CPU 52. Part of the signal light separated by the photocoupler 45 (equal to, for example, 1/11) is made to branch into five by the star coupler 46, so that the photodiode 47 and the light band-pass fibers 48a–48d receive the respective parts of the signal light.

As has been described previously, the light band-pass filters 48a–48d are optical filters having a half-value width of 1 nm, which allow the wavelengths 1540 nm, 1550 nm, 1560 nm and 1570 nm to pass, respectively. Spontaneously emitted lights from the respective light band-pass filters 48a–48d are input to the photodiodes 47a–47d, which detect the respective light intensities. The intensities of the spontaneous emission lights in the respective wavelength bands are digitized by the A/D converters 50a–50d, and are then applied to the CPU 52.

The CPU 52 calculates the wavelength (peak wavelength) at which the maximum value can be obtained when fitting the light intensities of the respective bands to a three-order function by means of the least square method. Then, the CPU 52 supplies the bias control circuit 54 with peak wavelength information which indicates the value of the peak wavelength and the output light intensity.

Most of the signal light separated by the light coupler 45 is supplied to the erbium-doped fiber 42, which has a relatively short length, and forms the light amplifier in cooperation with the laser diode 16 and the wavelength distribution mirror 14. The signal light amplified by the above light amplifier is supplied to the wavelength distribution mirror 56. The erbium-doped fiber 42 is supplied with the 850 nm exciting light emitted from the laser diode 58 through the mirror 56, whereby the hole burning or ESA of the erbium-doped fiber 42 is controlled.

The mirror 56 combines the signal light with the exciting light having a wavelength of, for example, 810 nm supplied from the laser diode 58 so as to cause the ESA or hole burning. The pack power dependent on the intensity of the exciting light emitted from the laser diode 58 is supplied to the bias control circuit 54. Further, the signal light output from the mirror 56 is output to the mirror 28 through the mirror 62 and the light isolator 60 used to prevent oscillation.

Part of the signal light separated by the mirror 62 is supplied to the photodiode 64, which detects the intensity of the received signal light. The automatic level control circuit 24 is supplied with the detected light intensity, and controls the intensity of the exciting light emitted from the laser diode 16 so that the intensity of the output light from the erbium-doped fiber 42 is made constant.

The bias control circuit 54 controls the output of the laser diode 58 in the state in which the output light is subjected to the automatic level control based on the back power so that the wavelength obtained at the maximum value of the ASE component is not changed.

It is possible to operate the light amplifier in the state in which the inverted population coefficient is constant by comparing the intensities of three or more spontaneous emission lights having different wavelengths and performing fitting of the intensities by the least square method which uses a function having an order of an integer equal to or less than the number of waveform measuring points. It can be seen from equation (1) that the wavelength-dependence of the gain is determined only by the inverted population coefficient. Hence, by using the above principle, it is possible to realize the light amplifier in which the wavelength-dependence of the gain is not varied independently of the input light. In this way, the intensity of the output light of the erbium-doped fiber 42 is optimized so that it has an optimal value to the next-stage light amplifying part including the erbium-doped fiber 32.

The mirror 28 combines the signal light with the 980 nm or 1480 nm exciting light supplied from the laser diode 16, the combined light being applied to the erbium-doped fiber 32. The back power dependent on the intensity of the exciting light from the laser diode 16 is supplied to the automatic level control circuit 34, which controls the laser diode 30 so that the intensity of the exciting light emitted from the laser diode 30 is constant.

The erbium-doped fiber 32 forms a light amplifier in cooperation with the mirror 28 and the laser diode 30, and has a larger amount of erbium or a longer length than the erbium-doped fiber 42. The erbium-doped fiber 32 is supplied with the signal light having the intensity optimized by the erbium-doped fiber 42 and the exciting light having the optimized intensity from the laser diode 30. That is, the intensity of the input light to the erbium-doped fiber 32 is made constant. The signal light amplified by the erbium-doped fiber 32 passes through the light isolator 36 used to prevent oscillation, and is output to the light output terminal 38.

In the thirteenth embodiment of the present invention, the output light of the front-stage light amplifier is amplified by the rear-stage light amplifier having a constant gain, so that the input-light-intensity-dependence of the wavelength-dependence of the gain can be suppressed and a large signal gain can be obtained.

Figure 16:
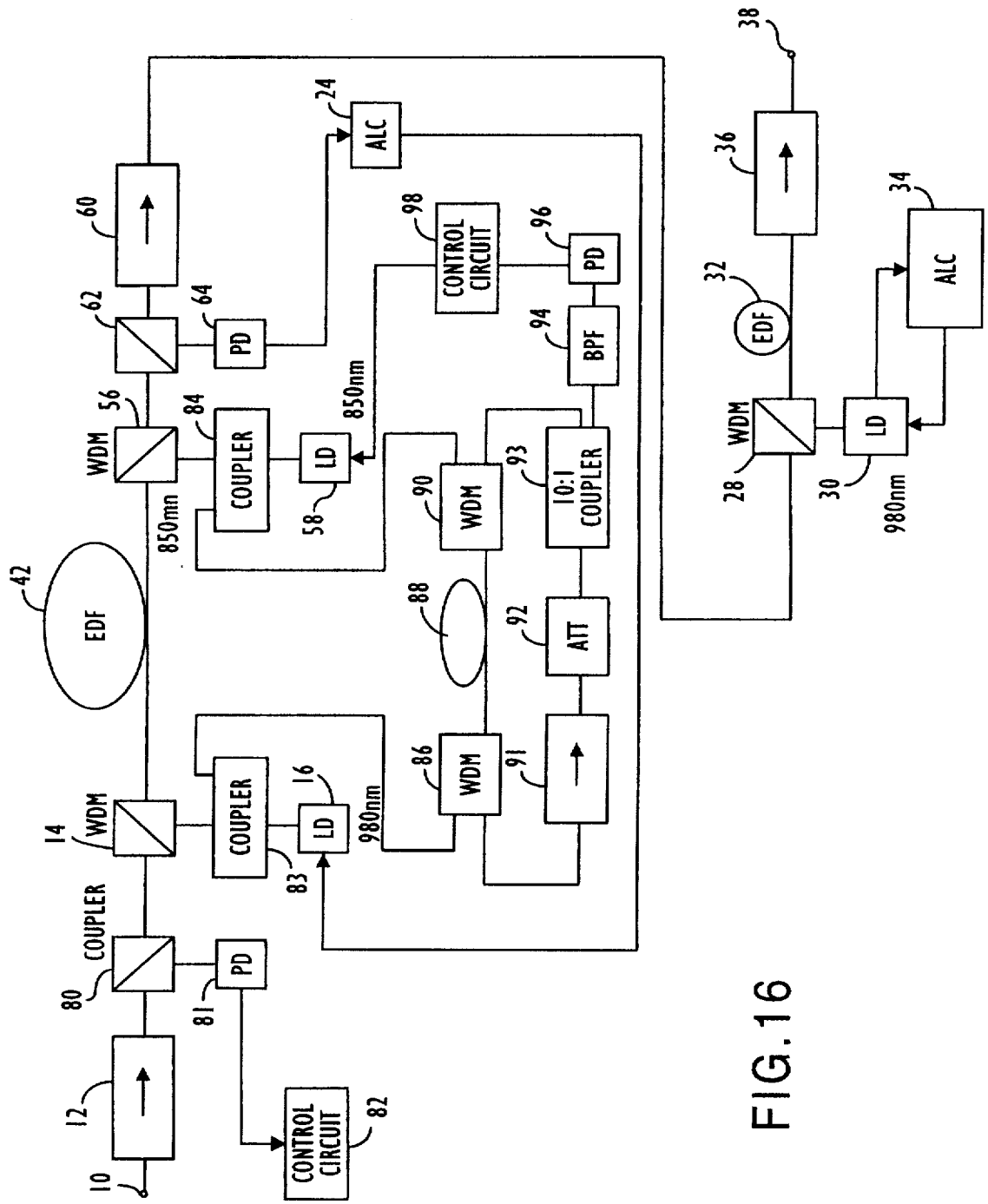
FIG. 16 is a block diagram of a light amplifier according to a fourteenth embodiment of the present invention.

FIG. 16 is a block diagram of a light amplifier according to a fourteenth embodiment of the present invention in which the configuration shown in FIG. 2 is modified so that the front stage between the light input terminal 10 and the light isolator 26 shown in FIG. 2 is replaced by the configuration shown in FIG. 9. The input signal light in the 1550 nm band applied to the light input terminal 10 passes through the light isolator 12 used to prevent oscillation, and is supplied to the coupler 80. Part of the signal light is separated by the coupler 80, and is then supplied to the photodetector 81, which detects the intensity of the signal light. The control circuit 82 is notified of the detected intensity of the signal light.

Most of the signal light is supplied to the mirror 14 from the coupler 80. The mirror 14 is supplied, through the coupler 83, with the exciting light having a wavelength of, for example, 980 nm generated by the laser diode 16. The mirror 14 combines the signal light with the exciting light, and supplies the combined wave to the erbium-doped fiber 42, which has a relatively short length. The erbium-doped fiber 42 amplifies the signal light. The erbium-doped fiber 42 is supplied, through the coupler 84 and the mirror 56, with the exciting light having a wavelength of, for example, 850 nm generated by the laser diode 58, so that the hole burning or ESA takes place.

Part of the exciting light having a wavelength of 980 nm separated by the coupler 83 is combined with the loop light by means of the wavelength distribution mirror 86. The combined light is supplied to the erbium-doped fiber 88, which forms the fourth light amplifier. Part of the 850 nm exciting light separated by the coupler 84 is combined with the loop light by means of the wavelength distribution mirror 90. The combined light is supplied to the erbium-doped fiber 88. As has been described previously, the ASE cyclic system is formed by the mirror 86, the light isolator 91, the attenuator (ATT) 92, the coupler 93, the mirror 90, and the erbium-doped fiber 88. In the ASE cyclic system, the level of a wavelength having a large gain is increased so that a peak is formed.

When the outputs of the laser diodes 16 and 58 are at respective constant levels, the loop gain of the ASE cyclic system is varied by changing the amount of attenuation at the attenuator 92 by means of the control circuit 82 in accordance with the intensity of the input signal light. Due to the input-light-intensity-dependence of the wavelength-dependence of the gain, the wavelength of the peak in the ASE cyclic system is varied.

Now, the pre-adjustment is performed by varying the intensity of the input signal light so that the wavelength of the peak of the gain of the erbium-doped fibers is not changed. This is done by adjusting the output value of the laser diode 16 and the output value of the laser diode 58. The amount of attenuation of the attenuator 92 is measured so that the peak wavelength of the ASE cyclic system is not changed when adjusting the laser diodes 16 and 58. The information thus obtained (the amount of attenuation of the attenuator 92 and the intensity of the input signal light) is stored in the control circuit 82.

Part of the loop light separated by the coupler 93 of the ASE cyclic system is supplied to the photodetector 96 via the band-pass filter 94 which allows the peak wavelength of the ASE cyclic system to pass therethrough. The photodetector 96 detects the intensity of the peak wavelength, and notifies the control circuit 98 (which functions as the fourth control part) of the detected light intensity. The control circuit 98 controls the laser diode 58 so that the maximum light intensity can be obtained at the peak wavelength.

The output light of the mirror 56 passes through the coupler 62 and the light isolator 60, and is output to the mirror 28. Part of the output light extracted by the coupler 62 is supplied to the photodetector 64, which detects the intensity of the output light. The automatic level control circuit 24, which functions as the fourth control part, controls the laser diode 16 on the basis of the detected light intensity so that the intensity of the output light is constant.

That is, the intensity of the exciting lights respectively emitted from the laser diodes 16 and 58 are controlled so that the ASE peak wavelength is the same as that obtained in the adjustment by varying the amount of attenuation of the attenuator 92 on the basis of the intensity of the input light. Hence, the wavelength-dependence of the gain of the light amplifier becomes independent of the intensity of the input light.

In the fourteenth embodiment of the present invention, the output of the first-stage light amplifier is amplified by the second-stage light amplifier having a constant gain, so that the input-light-intensity-dependence of the wavelength-dependence of the gain can be suppressed and an increased signal gain can be obtained.

Figure 17:
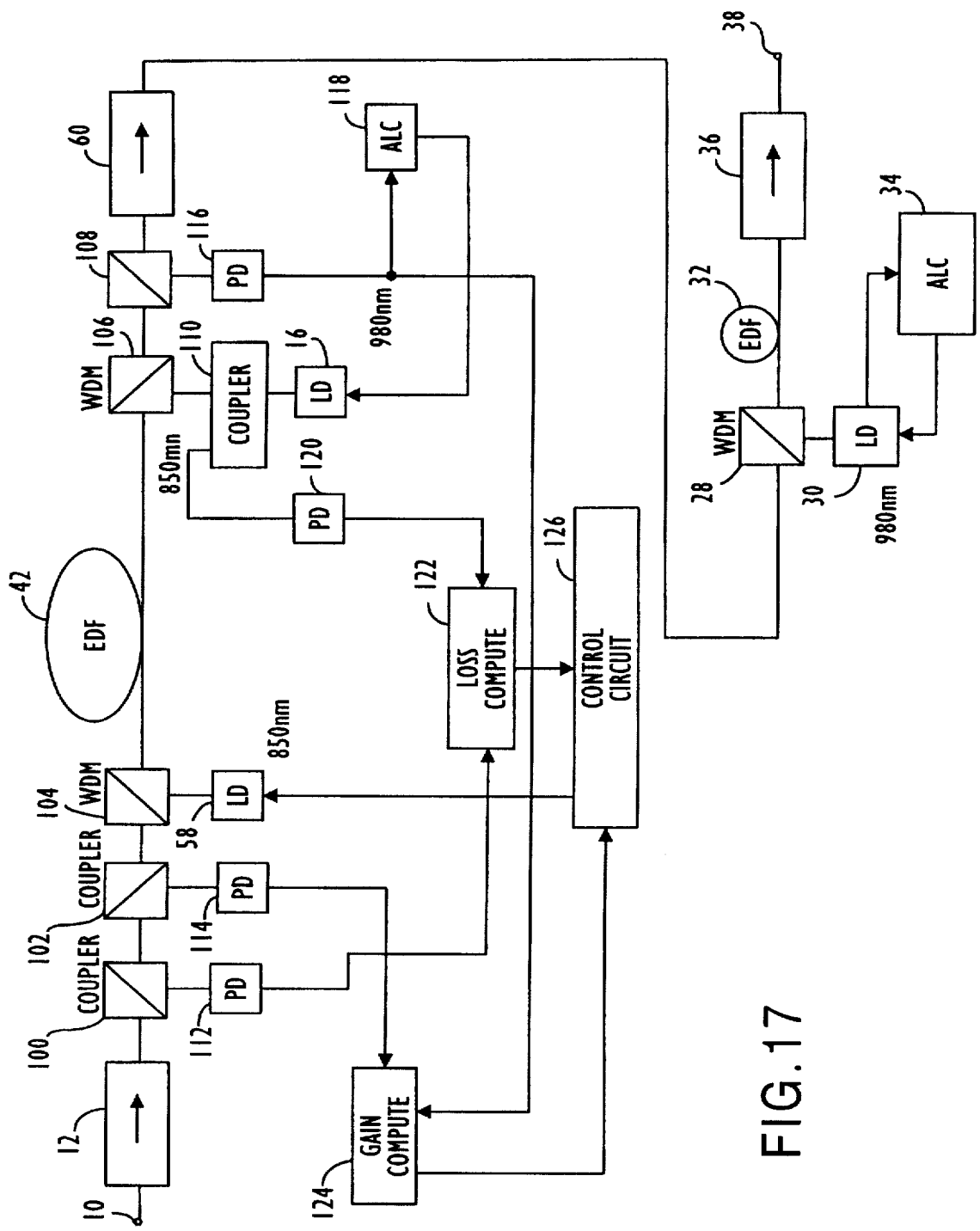
FIG. 17 is a block diagram of a light amplifier according to a fifteenth embodiment of the present invention.

FIG. 17 is a block diagram of a light amplifier according to a fifteenth embodiment of the present invention in which the configuration shown in FIG. 2 is modified so that the front stage between the light input terminal 10 and the light isolator 26 shown in FIG. 2 is replaced by the configuration shown in FIG. 10. The input signal light in the 1550 nm band applied to the light input terminal 10 passes through the light isolator 12 used to prevent oscillation, and is supplied to the mirror 104 through the coupler 100 and 102. The signal light with the exciting light combined is supplied to the erbium-doped fiber 42.

As has been described previously, the mirror 106 is supplied, via the coupler 110, with the 980 nm exciting light generated by the laser diode 16, and combines the signal light with the supplied exciting light. In the erbium-doped fiber 42, the signal light is amplified by the 980 nm exciting light. The hole burning or ESA is caused by the 850 nm exciting light. The signal light amplified by the erbium-doped fiber 42 is output via the mirror 106, and passes through a coupler 108 and the light isolator 60 used to prevent oscillation. Then, the signal light is output via the wavelength distribution mirror 28.

Part of the 980 nm exciting light is separated by the coupler 100, and the photodetector 112 detects the intensity of the exciting light. Part of the input signal light is separated by the coupler 102, and the intensity thereof is detected by the photodetector 114.

Part of the output signal light is separated by the coupler 108, and the intensity thereof is detected by the photodetector 116. The automatic level control circuit 118 controls the laser diode 16 so that the intensity of the output signal light is constant. Part of the 980 nm exciting light separated by the coupler 110 is supplied to the photodetector 120, which detects the intensity of the exciting light.

The loss computation part 122 computes a loss of the 980 nm exciting light from the intensities of the output lights of photodetectors 120 and 112. The gain computation part 124 computes the gain of the signal light from the intensities of the lights detected by the photodetectors 116 and 114. The control circuit 126 obtains the ratio of the logarithm of the loss of the exciting light to the logarithm of the gain of the signal light, and thereby controls the laser diode 58 so that the inverted population coefficient is constant and the wavelength-dependence of the gain is not varied independently of the intensity of the input light. In the above manner, the intensity of the output light of the erbium-doped fiber 42 is optimized so that it has an optimal value with respect to the next-stage light amplifier having the erbium-doped fiber 32.

The mirror 28 combines the signal light with the 980 nm or 1480 nm exciting light supplied from the laser diode 16, the combined light being applied to the erbium-doped fiber 32. The back power dependent on the intensity of the exciting light from the laser diode 16 is supplied to the automatic level control circuit 34, which controls the laser diode 30 so that the intensity of the exciting light emitted from the laser diode 30 is constant.

The erbium-doped fiber 32 forms a light amplifier in cooperation with the mirror 28 and the laser diode 30, and has a larger amount of erbium or a longer length than the erbium-doped fiber 42. The erbium-doped fiber 32 is supplied with the signal light having the intensity optimized by the erbium-doped fiber 42 and the exciting light having the optimized intensity from the laser diode 30. That is, the intensity of the input light to the erbium-doped fiber 32 is made constant. The signal light amplified by the erbium-doped fiber 32 passes through the light isolator 36 used to prevent oscillation, and is output to the light output terminal 38.

In the fifteenth embodiment of the present invention, the output of the first-stage light amplifier is amplified by the second-stage light amplifier having a constant gain, so that the input-light-intensity-dependence of the wavelength-dependence of the gain can be suppressed and an increased signal gain can be obtained.

The present invention is not limited to the specifically disclosed embodiments, and variations and modifications may be made without departing from the scope of the present invention.

What is claimed is:

1. A light amplifier comprising:
    an amplifier part for amplifying input wavelength-multiplexed signal light in accordance with exciting light supplied thereto:
    a first photodetector detecting intensity of the input wavelength-multiplexed signal light;
    a second photodetector detecting intensity of an output wavelength-multiplexed signal light obtained from said amplifier part by amplifying said input wavelength-multiplexed signal light; and
    a gain control circuit controlling the exciting light based on said intensity of the input wavelength-multiplexed signal light obtained by the first photodetector and said intensity of the output wavelength-multiplexed signal light obtained by the second photodetector.

2. The light amplifier as claimed in claim 1, further comprising an isolator which allows the input wavelength-multiplexed signal light to be applied to the amplifier part.

3. The light amplifier as claimed in claim 1, further comprising a wavelength distribution mirror which combines the input wavelength-multiplexed signal light and the exciting light.

4. The light amplifier as claimed in claim 1, further comprising a first coupler which separates the input wavelength-multiplexed signal light input to be applied to the first photodetector.

5. The light amplifier as claimed in claim 1, further comprising a second coupler which separates the output wavelength-multiplexed signal to be applied to the second photodetector.

6. The light amplifier as claimed in claim 1, wherein the amplifier part comprises an erbium-doped optical fiber amplifier.

7. The light amplifier as claimed in claim 1, further comprising an isolator through which the output wavelength-multiplexed signal from the amplifier part passes and is output from the light amplifier.

8. The light amplifier as claimed in claim 1, wherein the automatic gain control circuit controls the gain of the amplifier part so as to be maintained at a constant level.

9. A light amplifying method comprising the steps of:

amplifying input wavelength-multiplexed signal light in accordance with exciting light supplied thereto;

detecting the input wavelength-multiplexed signal light;

detecting said amplified input wavelength-multiplexed signal light; and controlling the exciting light for a gain of an amplifying operation so as to be maintained at a constant level, which is determined by an intensity of the input wavelength-multiplexed signal light and an intensity of the amplified input wavelength-multiplexed signal light.

10. A light amplifier comprising:

an amplifier part for amplifying input wavelength-multiplexed signal light in accordance with exciting light supplied thereto, said amplifier part being an erbium-doped optical fiber amplifier;

a bandpass filter eliminating unwanted components without the input wavelength-multiplexed signal light amplified by said amplifier part;

a first photodetector detecting intensity of the input wavelength-multiplexed signal light;

a second photodetector detecting intensity of an output wavelength-multiplexed signal light obtained from said amplifier part by amplifying said input wavelength-multiplexed signal light and filtered by said band pass filter; and a gain control circuit controlling the exciting light for a gain of said amplifier part determined by said intensity of the input wavelength-multiplexed signal light obtained by the first photodetector and said intensity of the output wavelength-multiplexed signal light obtained by the second photodetector.

11. A light amplifier comprising:

an amplifier part for amplifying an input wavelength-multiplexed signal light in accordance with exciting light supplied thereto;

a first photodetector detecting intensity of the input wavelength-multiplexed signal light;

a second photodetector detecting intensity of an output wavelength-multiplexed signal light obtained from said amplifier part by amplifying the input wavelength-multiplexed signal light;

a control circuit controlling a gain of said amplifier part determined by said intensity of the input wavelength-multiplexed signal light obtained by the first photodetector and said intensity of the output wavelength-multiplexed signal light obtained by the second photodetector; and a control part which performs a control operation so that an intensity of an amplified light signal output from the amplifier part is controlled.

* * * * *